US011067771B2

(12) United States Patent
Usui

(10) Patent No.: US 11,067,771 B2
(45) Date of Patent: Jul. 20, 2021

(54) OBSERVATION APPARATUS, CONTROL METHOD, AND COMPUTER-READABLE MEDIUM FOR CHANGING A RELATIVE DISTANCE BETWEEN A STAGE AND OPTICAL SYSTEM BASED ON DETERMINED RELIABILITY OF IN-FOCUS POSITION

(71) Applicant: OLYMPUS CORPORATION, Tokyo (JP)

(72) Inventor: Shogo Usui, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/701,352

(22) Filed: Dec. 3, 2019

(65) Prior Publication Data

US 2020/0183127 A1  Jun. 11, 2020

(30) Foreign Application Priority Data

Dec. 10, 2018 (JP) .............................. JP2018-230495

(51) Int. Cl.
*G02B 7/28* (2021.01)
*G06T 7/33* (2017.01)
(Continued)

(52) U.S. Cl.
CPC ................ *G02B 7/28* (2013.01); *G06T 7/337* (2017.01); *H04N 5/23212* (2013.01); *G02B 21/006* (2013.01)

(58) Field of Classification Search
CPC ...... G02B 7/28; G02B 21/006; G02B 21/367; H04N 5/23212; G06T 7/337
See application file for complete search history.

(56) References Cited

U.S. PATENT DOCUMENTS

2008/0192139 A1* 8/2008 Kanai ............... H04N 5/232123
348/360
2016/0011409 A1* 1/2016 Oshima ............ H04N 5/232122
348/80
(Continued)

FOREIGN PATENT DOCUMENTS

JP  2012-208512 A  10/2012
JP  2018-000102 A  1/2018

*Primary Examiner* — Gevell V Selby
(74) *Attorney, Agent, or Firm* — Scully, Scott, Murphy & Presser, P.C.

(57) ABSTRACT

An observation apparatus includes: an image capturing apparatus that includes an imaging surface and captures an image of an object to be observed; an optical system that projects an optical image of the object onto the image capturing apparatus; a focusing unit that adjusts, with reference to the optical-axis direction of the optical system, the relative positional relationship between the object and a surface optically conjugate to the imaging surface; and a processor that controls at least the image capturing apparatus and the focusing unit. The processor decides an in-focus position for the focusing unit based on a plurality of images of the object that acquired by the image capturing apparatus, the plurality of images each being an image acquired when the focusing unit is located at a different position; determines the reliability of the decided in-focus position; and when determining that the in-focus position is not reliable, moves the focusing unit sequentially to a plurality of positions and causes the image capturing apparatus to acquire, for each of the plurality of positions, a candidate image of the object.

29 Claims, 25 Drawing Sheets

(51) Int. Cl.
*H04N 5/232* (2006.01)
*G02B 21/00* (2006.01)

(56) References Cited

U.S. PATENT DOCUMENTS

| | | | | |
|---|---|---|---|---|
| 2016/0150166 A1* | 5/2016 | Hashimoto | ........ | H04N 5/23245 |
| | | | | 348/241 |
| 2017/0302844 A1* | 10/2017 | Nakamoto | ......... | H04N 5/23212 |
| 2018/0217358 A1* | 8/2018 | Tanaka | ............... | H04N 5/23216 |
| 2019/0121058 A1 | 4/2019 | Wakui | | |

* cited by examiner

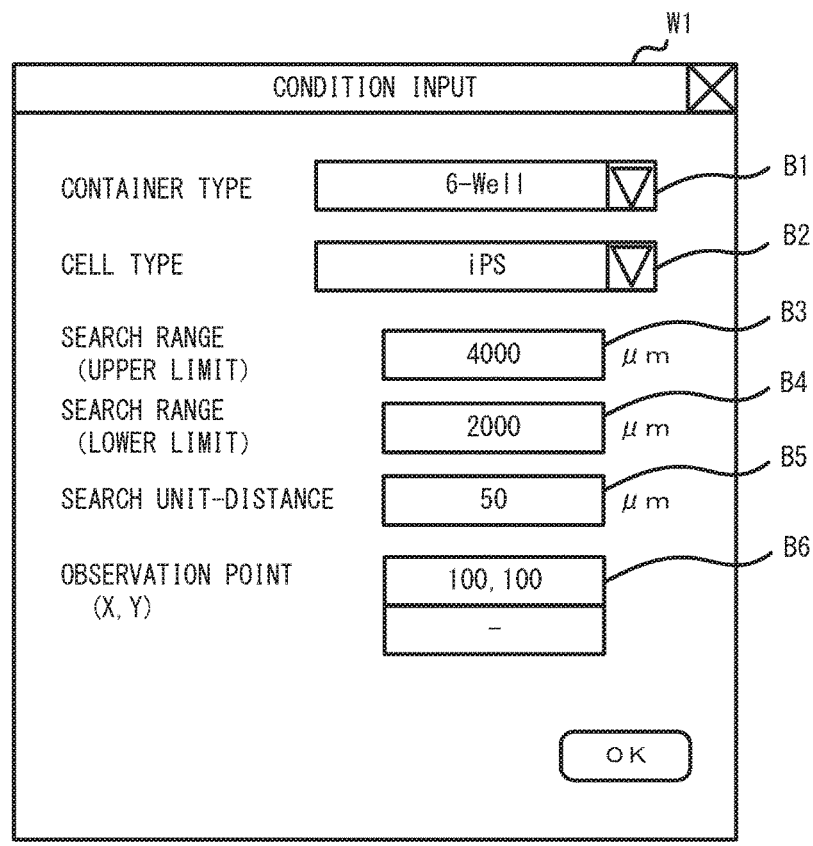
F I G. 4

| | RANGE FROM AVERAGE VALUE MINUS $3\sigma$ TO AVERAGE VALUE PLUS $3\sigma$ |
|---|---|
| SPECIFIED RANGE | 3567~3933 |

F I G. 1 4

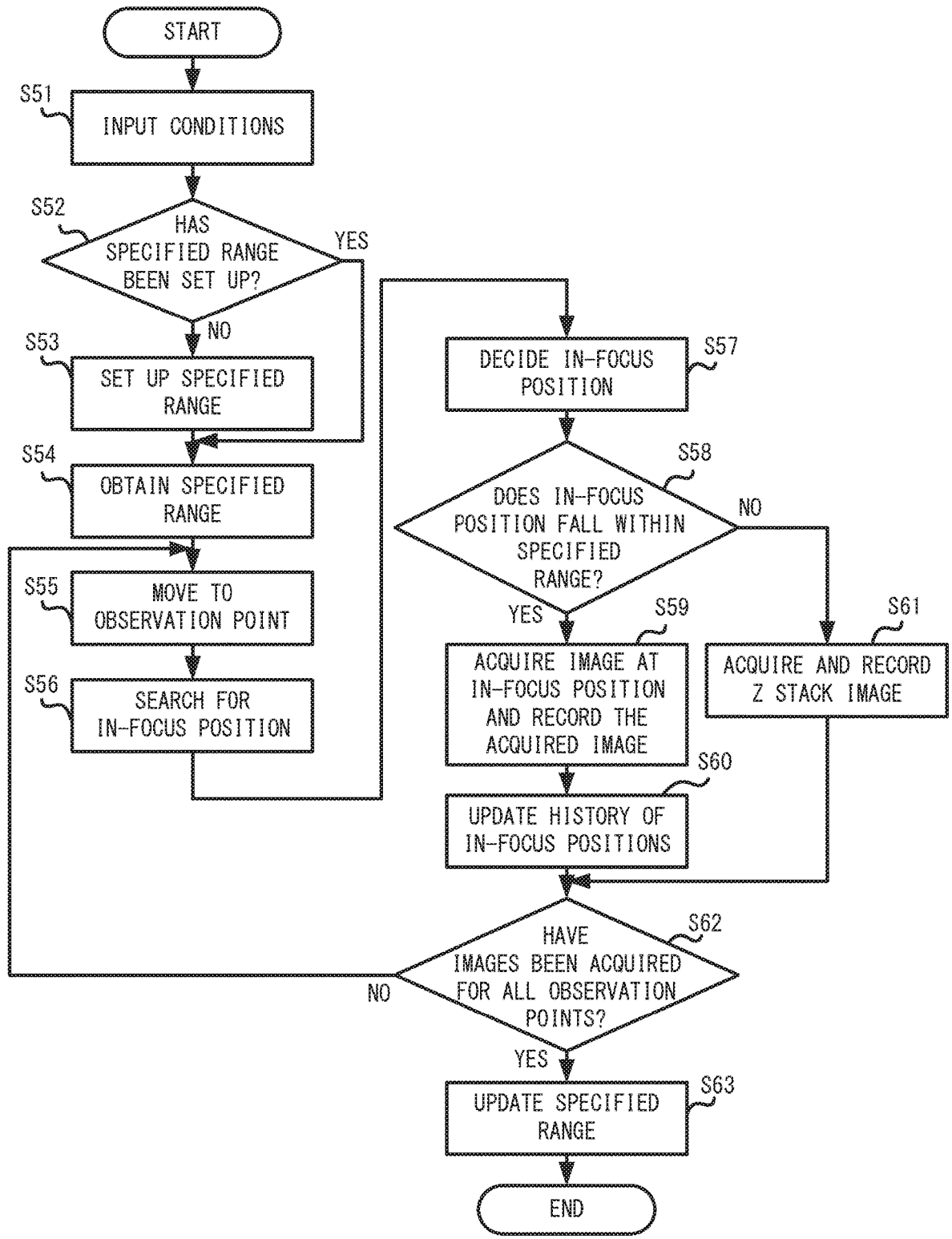
F I G. 15

| OBSERVATION POINTS | SPECIFIED RANGE ($Z' \pm 3\sigma'$) |
|---|---|
| OBSERVATION POINT1-7 | 3467~3950 |
| OBSERVATION POINT3-5 | 3337~3750 |
| SPECIFIED RANGE4-2 | 3205~3689 |

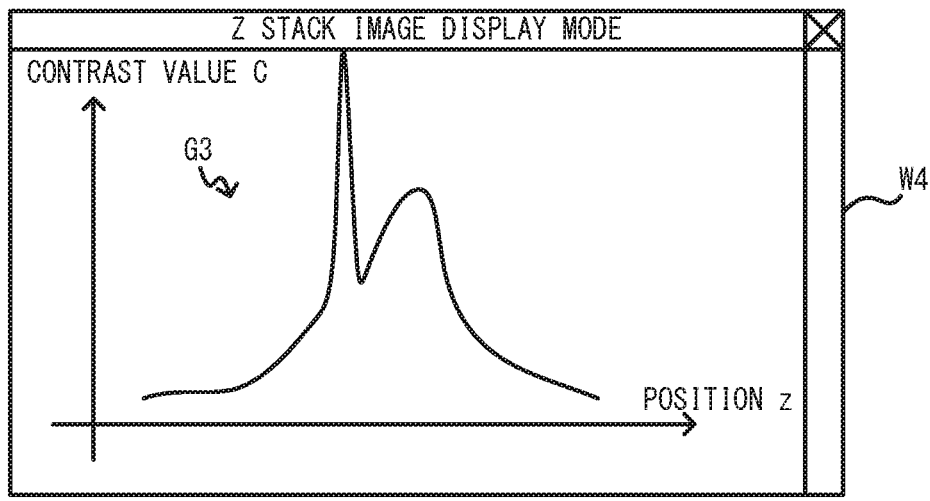
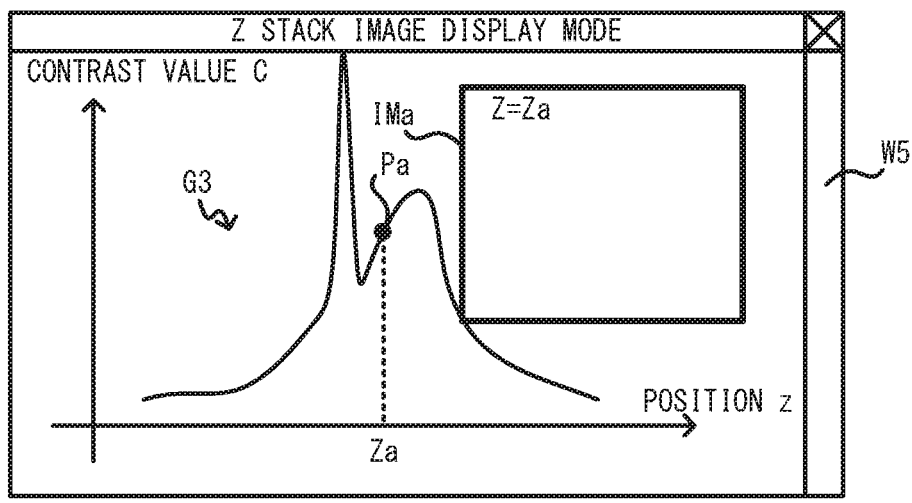
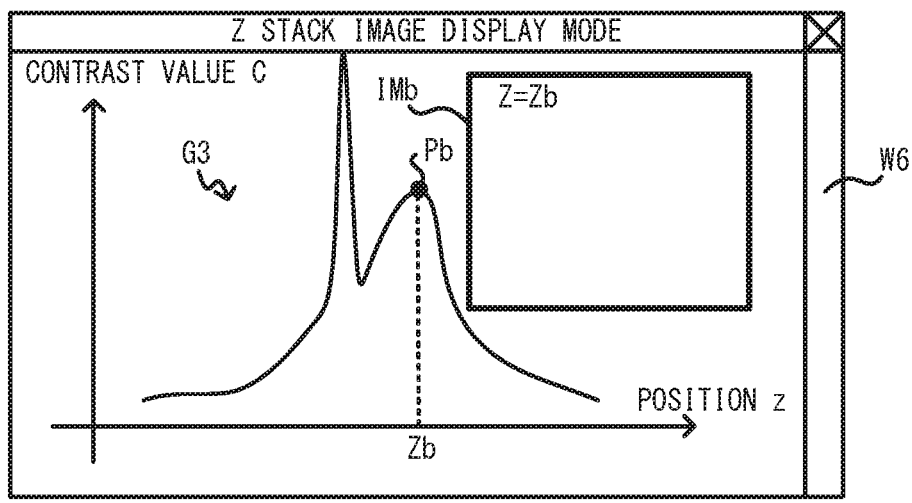
FIG. 22

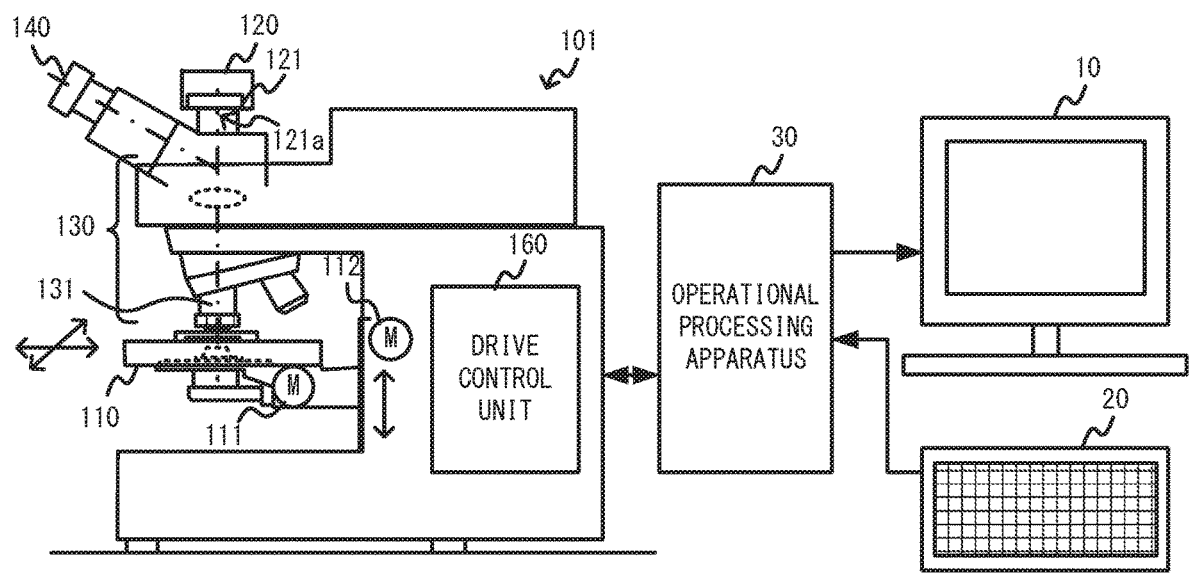
F I G. 2 3

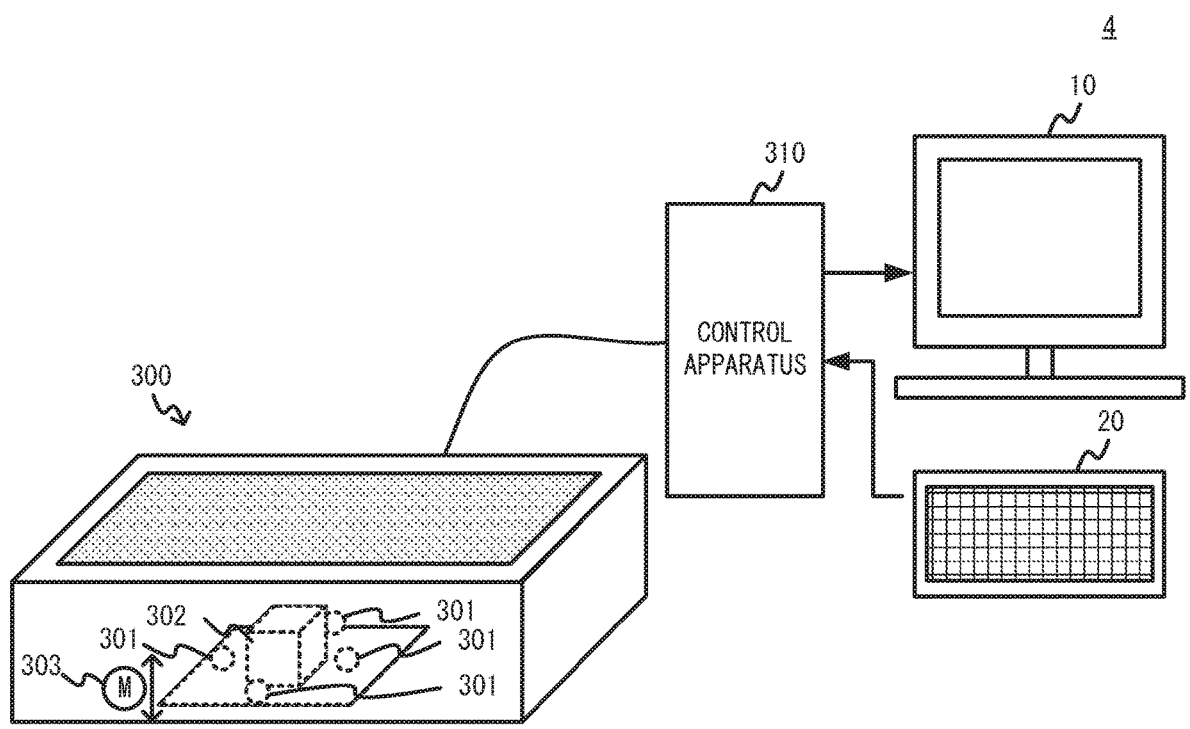
F I G. 2 5

OBSERVATION APPARATUS, CONTROL METHOD, AND COMPUTER-READABLE MEDIUM FOR CHANGING A RELATIVE DISTANCE BETWEEN A STAGE AND OPTICAL SYSTEM BASED ON DETERMINED RELIABILITY OF IN-FOCUS POSITION

CROSS-REFERENCE TO RELATED APPLICATION

This application is based upon and claims the benefit of priority from prior Japanese Patent Application No. 2018-230495, filed Dec. 10, 2018, the entire contents of which are incorporated herein by this reference.

BACKGROUND OF THE INVENTION

Field of the Invention

The disclosures herein are related to an observation apparatus, a control method, and a computer-readable medium.

Description of the Related Art

Many observation apparatuses such as microscopes are equipped with an automatic focusing (hereinafter referred to as AF) function to perform observation tasks efficiently. There are various schemes for AF, and currently, passive schemes which have, for example, the advantage of allowing for a simple equipment configuration are mainstream.

Contrast AF, which is based on a passive scheme, is described in, for example, Japanese Laid-open Patent Publication Nos. 2018-000102 and 2012-208512. Japanese Laid-open Patent Publication No. 2018-000102 describes the feature of shortening the time required for image shooting by correcting an in-focus position every time image shooting is performed, rather than by performing AF every time image shooting is performed. Japanese Laid-open Patent Publication No. 2012-208512 describes the feature of controlling a focusing lens by using the reliability of a result of detection of the face of a photogenic subject.

SUMMARY OF THE INVENTION

An observation apparatus in accordance with an aspect of the present invention includes: an image capturing apparatus that includes an imaging surface and captures an image of an object to be observed; an optical system that projects an optical image of the object onto the image capturing apparatus; a focusing unit that adjusts, with reference to the optical-axis direction of the optical system, the relative positional relationship between the object and a surface optically conjugate to the imaging surface; and a processor that controls at least the image capturing apparatus and the focusing unit. The processor decides an in-focus position for the focusing unit based on a plurality of images of the object that acquired by the image capturing apparatus, the plurality of images each being an image acquired when the focusing unit is located at a different position; determines reliability of the decided in-focus position; and when determining that the in-focus position is not reliable, moves the focusing unit sequentially to a plurality of positions and causes the image capturing apparatus to acquire, for each of the plurality of positions, a candidate image of the object.

A control method in accordance with an aspect of the invention is a method of controlling an observation apparatus that includes: an image capturing apparatus that includes an imaging surface and captures an image of an object to be observed; an optical system that projects an optical image of the object onto the image capturing apparatus; and a focusing unit that adjusts, with reference to the optical-axis direction of the optical system, the relative positional relationship between the object and a surface optically conjugate to the imaging surface. The control method includes: deciding an in-focus position for the focusing unit based on a plurality of images of the object that acquired by the image capturing apparatus, the plurality of images each being an image acquired when the focusing unit is located at a different position; determining reliability of the decided in-focus position; and when determining that the in-focus position is not reliable, moving the focusing unit sequentially to a plurality of positions and causing the image capturing apparatus to acquire, for each of the plurality of positions, a candidate image of the object.

A non-transitory computer-readable medium in accordance with an aspect of the invention has stored therein a program for causing a computer for an observation apparatus to perform a process, the observation apparatus including: an image capturing apparatus that includes an imaging surface and captures an image of an object to be observed; an optical system that projects an optical image of the object onto the image capturing apparatus; and a focusing unit that adjusts, with reference to the optical-axis direction of the optical system, the relative positional relationship between the object and a surface optically conjugate to the imaging surface. The process includes: deciding an in-focus position for the focusing unit based on a plurality of images of the object that acquired by the image capturing apparatus, the plurality of images each being an image acquired when the focusing unit is located at a different position; determining reliability of the decided in-focus position; and when determining that the in-focus position is not reliable, moving the focusing unit sequentially to a plurality of positions and causing the image capturing apparatus to acquire, for each of the plurality of positions, a candidate image of the object.

BRIEF DESCRIPTION OF THE DRAWINGS

The present invention will be more apparent from the following detailed description when the accompanying drawings are referenced.

FIG. 4 exemplifies a condition input screen;

FIG. 13 exemplifies a table T3 that includes information on a specified range;

FIG. 14 exemplifies a table T4 that includes information on specified ranges;

FIG. 15 is a flowchart illustrating the flow of a control process in accordance with a fourth embodiment;

FIG. 19 exemplifies a table T5 that includes information on specified ranges;

FIG. 22 illustrates still another example of a Z stack display screen;

FIG. 23 exemplifies the configuration of an observation system 2;

FIG. 25 exemplifies the configuration of an observation system 4.

DESCRIPTION OF THE EMBODIMENTS

There are quite many kinds of objects that could be observed by observation apparatuses. For example, various objects to be observed, e.g., industrial samples such as films having layered structures and living cells with each individual having a different size and shape, may be observed using observation apparatuses. It would be difficult to always correctly focus on such various objects to be observed by performing AF, even if the features described in Japanese Laid-open Patent Publication Nos. 2018-000102 and 2012-208512 are used.

The following describes embodiments of the present invention in detail.

Figure 1:
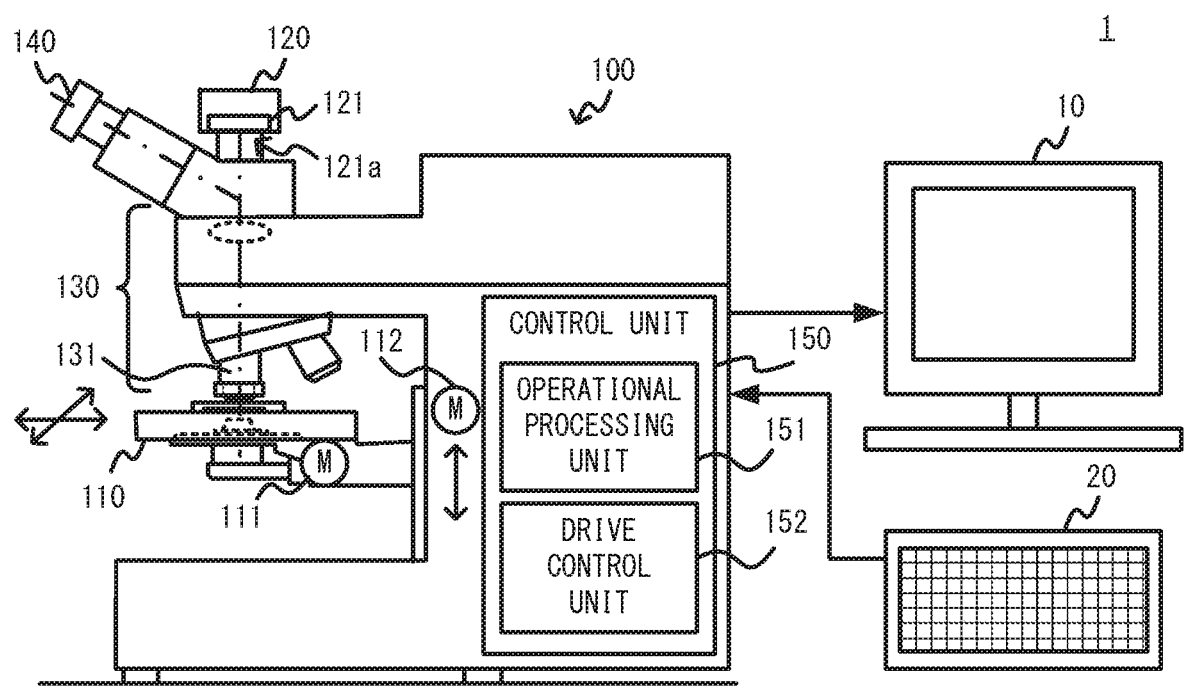
FIG. 1 exemplifies the configuration of an observation system 1.

FIG. 1 exemplifies the configuration of an observation system 1. The observation system 1 is a system for observing an arbitrary object to be observed. The observation system 1 includes an observation apparatus 100 that is an upright microscope, a display apparatus 10, and an input apparatus 20. The observation apparatus 100 is not limited to a microscope apparatus. As long as the observation apparatus 100 performs AF, the observation apparatus 100 may be, for example, a digital camera or an endoscope apparatus.

For example, the display apparatus 10 may be a liquid crystal display, an organic EL (OLED) display, or a cathode ray tube (CRT) display. The input apparatus 20 is, for example, a mouse, a keyboard, a joystick, or a touch panel. The input apparatus 20 may be a sound input apparatus such as a microphone. The display apparatus 10 and the input apparatus 20 are each communicably connected to the observation apparatus 100, but the connection method is not particularly limited. The connection may be communicably established via a cable or a radio communication.

The observation apparatus 100 includes an image capturing apparatus 120 that captures an image of an object to be observed, an image formation optical system 130 that projects an optical image of the object onto the image capturing apparatus 120, and a control unit 150. The image capturing apparatus 120 includes an imaging surface 121a. The image formation optical system 130 includes an objective 131. In addition, as depicted in FIG. 1, the observation apparatus 100 may include: a stage 110 on which an object to be observed is placed; a motor 111 that moves the stage 110 in a direction orthogonal to the optical axis of the image formation optical system 130; a motor 112 that moves the stage 110 in the optical-axis direction of the image formation optical system 130; and an eyepiece 140.

The stage 110 is a motorized stage. The stage 110 is moved in the optical-axis direction of the image formation optical system 130 by the control unit 150 controlling the rotation of the motor 112. Accordingly, the stage 110 is a focusing unit that adjusts the distance between the stage 110 and the image formation optical system 130 in the optical-axis direction of the image formation optical system 130. Thus, the observation apparatus 100 includes the focusing unit.

The focusing unit is not limited to the stage 110, as long as the focusing unit can adjust, with reference to the optical-axis direction of the image formation optical system 130, the relative positional relationship between an object to be observed and a surface optically conjugate to the imaging surface 121a (this optically conjugate surface will hereinafter simply be referred to as a conjugate surface). The focusing unit may be, for example, a revolver that moves in the optical-axis direction. Note that the adjusting of the relative positional relationship between an object to be observed and the conjugate surface may include making the adjustment by moving the conjugate surface to different positions and making the adjustment by moving the object to different positions. In the present embodiment, the conjugate surface is the focal plane of the objective 131 included in the image formation optical system 130, i.e., a plane distant from the principal point of the objective 131 by the focal length of the objective 131. In other words, the conjugate surface is orthogonal to the optical axis of the objective 131 and includes a focal position that is a point on which light resulting from a parallel pencil of light being incident on the objective 131 is focused.

The stage 110 is moved in a direction orthogonal to the optical axis of the image formation optical system 130 by the control unit 150 controlling the rotation of the motor 111, with the result that the object is also moved in the direction orthogonal to the optical axis of the image formation optical system 130. Thus, the stage 110 is a XY driving unit that moves the object in a direction orthogonal to the optical axis of the image formation optical system 130. Accordingly, the observation apparatus 100 includes the XY driving unit. The optical axis direction of the image formation optical system 130 and the direction orthogonal to the optical axis of the image formation optical system 130 may hereinafter respectively be referred to as a Z direction and a XY direction.

For example, the image capturing apparatus 120 may be a digital camera for a microscope. The image capturing apparatus 120 includes an image sensor 121. The image sensor 121 includes the imaging surface 121a. The image sensor 121 may be, but is not particularly limited to, a charge coupled device (CCD) image sensor or a complementary metal oxide semiconductor (CMOS) image sensor. The image capturing apparatus 120 may be a color image capturing apparatus or a monochrome image capturing apparatus.

For example, the image formation optical system 130 may be an optical system that includes an objective and a tube lens. The observation apparatus 100 may include a plurality of objectives mounted on a revolver. In this case, an objective disposed on the axis of observation light from among the plurality of objectives constitutes a portion of the image formation optical system 130.

The eyepiece 140 is used by the microscope user to observe a virtual image that is an enlarged version of an optical image formed by the image formation optical system 130.

The control unit 150 controls at least the image capturing apparatus 120 and the focusing unit. The control unit 150 includes an operational processing unit 151 that performs various operational processes on the basis of input information such as images and a drive control unit 152 that controls various driving units for the observation apparatus 100.

The operational processing unit 151 decides an in-focus position for the stage 110 on the basis of a plurality of images of an object to be observed that have been acquired by the image capturing apparatus 120. The in-focus position refers to a position at which the focusing unit (the stage 110 with reference to this example) in an in-focus state is to be located. The plurality of images are ones acquired within a range in which an in-focus position is searched for (hereinafter referred to as a search range), and the plurality of images are each an image acquired when the focusing unit is located at a different position. The operational processing unit 151 determines the reliability of the decided in-focus position. When the operational processing unit 151 has determined that the in-focus position is not reliable, the drive control unit 152 moves the focusing unit sequentially to a plurality of positions and causes the image capturing apparatus 120 to acquire, for each of the plurality of positions, an image of the object. The plurality of acquired images are each referred to as a candidate image. When the operational processing unit 151 has determined that the in-focus position is reliable, the drive control unit 152 may move the focusing unit to the in-focus position and cause the image capturing apparatus 120 to acquire an image of the object. Such an acquired image may be referred to as an in-focus image.

Figure 2:
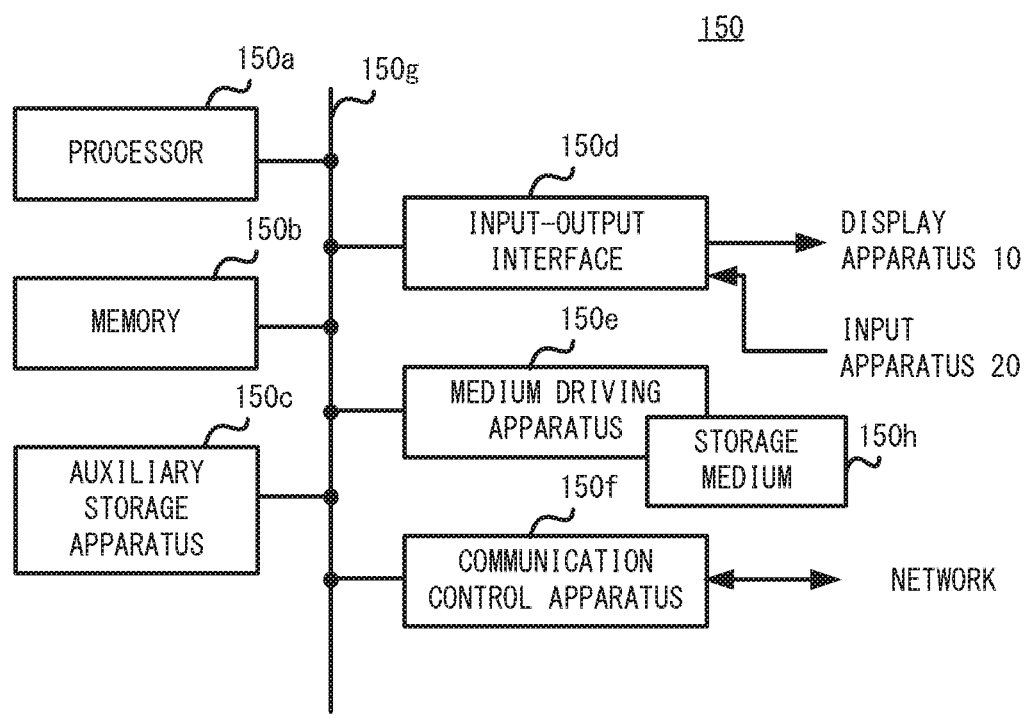
FIG. 2 exemplifies the configuration of a control unit 150.

FIG. 2 exemplifies the configuration of the control unit 150. The physical configuration of the control unit 150 is not particularly limited, but the control unit 150 is a computer for the observation apparatus 100 and includes circuitry. In particular, as depicted in FIG. 2, the control unit 150 may include, for example, a processor 150a, a memory 150b, an auxiliary storage apparatus 150c, an input-output interface 150d, a medium driving apparatus 150e, and a communication control apparatus 150f, all of which may be connected to each other by a bus 150g.

For example, the processor 150a may be an arbitrary processing circuit, and may include a central processing unit (CPU). The processor 150a may perform a programmed process by executing a program stored in the memory 150b, the auxiliary storage apparatus 150c, or a storage medium 150h, thereby implementing the functional elements of the control unit 150 depicted in FIG. 1 (operational processing unit 151, drive control unit 152). For example, the programmed process may be any of those depicted in FIGS. 3, 6, 8, 10, 15, 16, and 21, which will be described hereinafter. The processor 150a may be configured with a special purpose processor such as an application specific integrated circuit (ASIC) or a field-programmable gate array (FPGA). The elements of the control unit 150 depicted in FIG. 1 may each be implemented by circuitry.

The memory 150b is a working memory for the processor 150a. For example, the memory 150b may be an arbitrary semiconductor memory such as a random access memory (RAM). The auxiliary storage apparatus 150c is a nonvolatile memory such as an erasable programmable ROM (EPROM), a hard disc drive, or a flash memory. The input-output interface 150d communicates information with apparatuses external to the observation apparatus 100 (display apparatus 10, input apparatus 20).

The medium driving apparatus 150e may output data stored in the memory 150b and the auxiliary storage apparatus 150c to the storage medium 150h and read a program, data, or the like from the storage medium 150h. The storage medium 150h is an arbitrary portable record medium. For example, the storage medium 150h may include an SD card, a universal serial bus (USB) flash memory, a compact disc (CD), and a digital versatile disc (DVD).

The communication control apparatus 150f inputs/outputs information to/from a network. For example, a network interface card (NIC) or a wireless local-area-network (LAN) card may be used as the communication control apparatus 150f. The observation apparatus 100 and the display apparatus 10 and input apparatus 20 may communicate with each other via the communication control apparatus 150f. The processor 150a, the memory 150b, the auxiliary storage apparatus 150c, and the like are connected to each other by the bus 150g in a manner such that data can be communicated therebetween.

Figure 3:
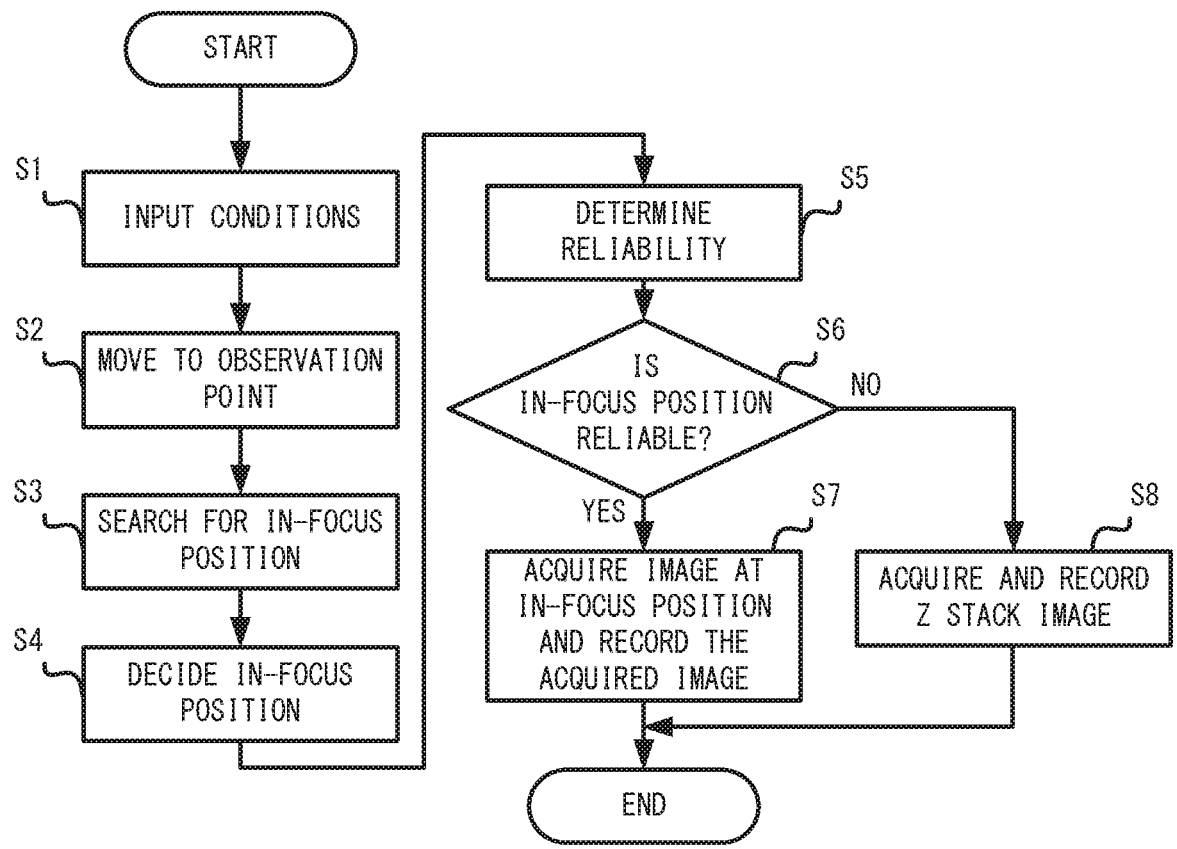
FIG. 3 is a flowchart illustrating the flow of a control process performed by an observation apparatus 100.
Figure 5:
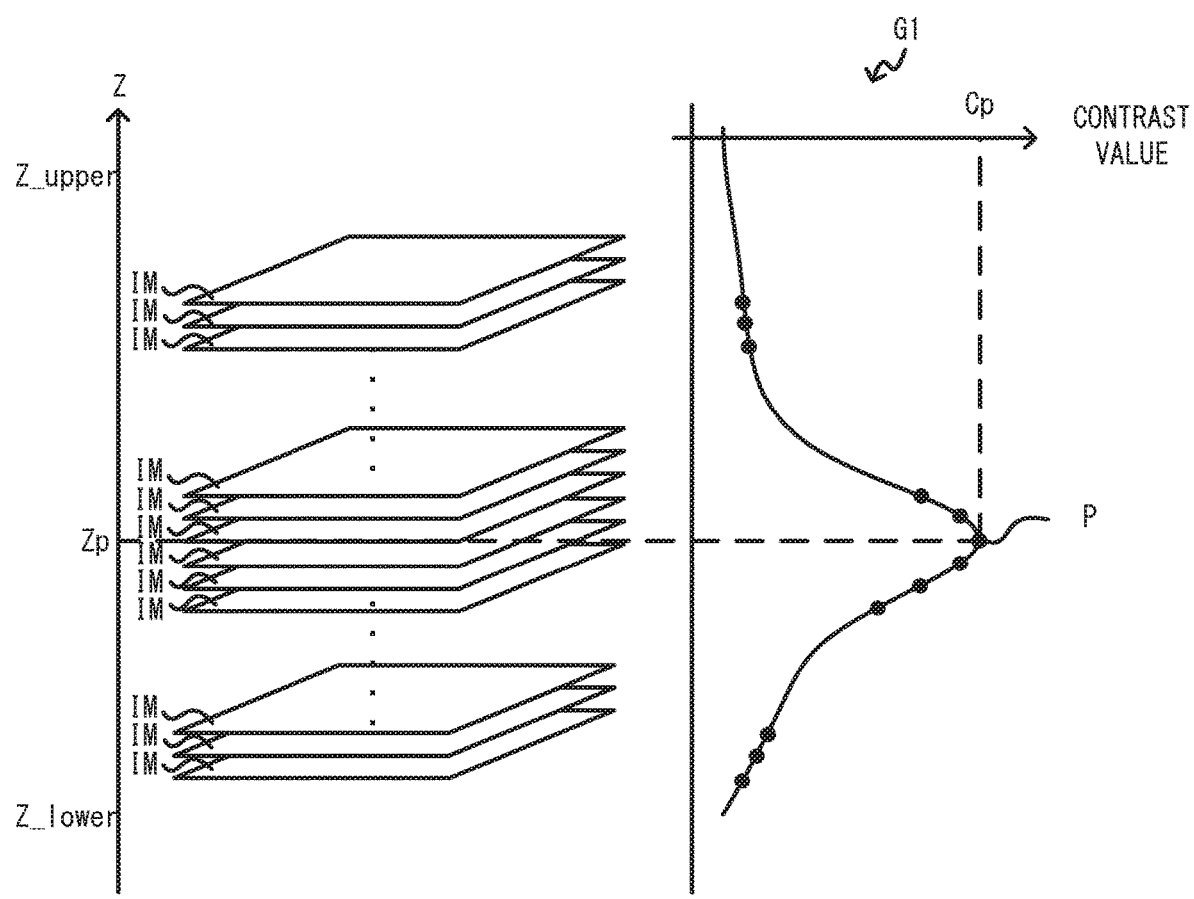
FIG. 5 is an explanatory diagram for a method of deciding an in-focus position.

The observation system 1 configured as described above is such that the observation apparatus 100 performs a control process depicted in FIG. 3. FIG. 3 is a flowchart illustrating the flow of the control process performed by the observation apparatus 100. FIG. 4 exemplifies a condition input screen. FIG. 5 is an explanatory diagram for a method of deciding an in-focus position. The following describes a method of controlling the observation apparatus 100 in more detail by referring to FIGS. 3-5.

The observation apparatus 100 receives input of observation conditions (step S1). In this example, the control unit 150 causes the display apparatus 10 to display, for example, a screen W1 depicted in FIG. 4 to receive input of observation conditions from the user.

The screen W1 depicted in FIG. 4 is a condition input screen that is an example of a screen displayed when an object to be observed is cultured cells. The user can input conditions such as a container type (e.g., a multi-well plate such as a 6-well plate, a flask such as a T75 flask), a cell type (e.g., iPS cell, mesenchymal stem cell), a search range, a search unit-distance, and an observation point. The control unit 150 acquires the input information as observation conditions. A search range, which is also referred to as an AF range, is a range in an optical-axis direction in which an in-focus position is searched for when performing AF. A search unit-distance indicates a unit of movement distance by which the focusing unit moves within the search range in the optical-axis direction. An observation point is a position within an object to be observed in a direction orthogonal to the optical axis. AF is a process of detecting an in-focus state for each observation point.

In step S1, the user may manually input all observation conditions. The control unit 150 may acquire the manually input information as observation conditions. The user may manually input some of the observation conditions. The control unit 150 may calculate other observation conditions on the basis of the manually input information or acquire both the manually input information and the information calculated by the control unit 150 as observation conditions.

For example, the user may select the type of a container accommodating cultured cells from a dropdown list B1 of the screen W1 and select the type of the cultured cells from a dropdown list B2; and then the control unit 150 may automatically calculate the search range and the search unit-distance and input these to text boxes B3-B5. The control unit 150 may identify an observation point on the basis of selection operations performed by the user while viewing a live image displayed on the display apparatus 10 and input this observation point to a text box B6. Then, upon an OK button being pressed, the control unit 150 may acquire the information input to the screen W1 as observation conditions. A plurality of observation points may be input to the screen W1, and the control unit 150 may acquire a plurality of observation points as observation conditions.

Upon acquiring observation conditions in step S1, the observation apparatus 100 moves a field of view to an observation point designated as an observation condition (step S2). The control unit 150 controls the rotation of the motor 111 so as to move the stage 110 in a manner such that the observation point is located at the center of the field of view of the observation apparatus 100. Accordingly, the control unit 150 moves the stage 110 so as to position the optical axis of the image formation optical system 130 on the observation point. In step S2, the user may move the field of view to the observation point by manually moving the stage 110.

When the movement to the observation point is finished, the observation apparatus 100 performs AF (steps S3 and S4). More specifically, the observation apparatus 100 first searches for an in-focus position (step S3) and decides an in-focus position (step S4).

In step S3, the drive control unit 152 controls the rotation of the motor 112 so as to move, as depicted in FIG. 5, the stage 110 from the upper limit (Z_upper) to lower limit (Z_lower), or vice versa, of the search range while stopping the stage 110 every time the stage 110 is moved by a search unit-distance. For each position after movement by the search unit-distance, the drive control unit 152 acquires an image IM of the object by controlling the image capturing apparatus 120. The operational processing unit 151 calculates a plurality of focus scores on the basis of a plurality of image IMs acquired in such a manner. In particular, a focus score is calculated for each of the plurality of image IMs.

A focus score is information correlated with an in-focus state. A focus score is, as a general rule, a contrast value but may be a luminance value or another parameter. The following descriptions are given with reference to an exemplary situation in which a contrast value is adopted as a focus score.

As an evaluation formula for evaluating an image contrast, the following formula is known wherein the squares of the differences between the pixel values of pairs of pixels distant from each other by n pixels in the X direction are summed for the entirety of image data so as to calculate the contrast value. The following formula is an evaluation formula proposed by J. F. Brenner, et al. and referred to as Brenner gradient.

$$F_{Brenner} = \sum_{y=1}^{H} \sum_{x=1}^{W-n} \{f(x, y) - f(x+n, y)\}^2 \quad (1)$$

In this formula, $F_{Brenner}$ is a contrast value; x, a variable identifying a pixel column forming image data; y, a variable identifying a pixel row forming image data; W, the number of pixels in the X direction that form image data (i.e., the number of columns); H, the number of pixels in the Y direction that form image data (i.e., the number of rows); f, a pixel value; and n, a shift amount, which is an integer (e.g., 2) indicating the distance between pixels between which a difference in pixel value is calculated. A pixel value is, for example, a luminance value.

A graph G1 depicted in FIG. 5 indicates a contrast curve created by plotting points each identified according to a combination of the position of the focusing unit and the contrast value of an image IM. The contrast curve may be created through interpolation by using plotted points or may be created by approximating a function based on plotted points.

In step S4, the operational processing unit 151 decides that a position for the focusing unit for which a focus score indicates a peak is an in-focus position. In particular, the operational processing unit 151 identifies a point P on the contrast curve at which the contrast value becomes a maximum value Cp, as depicted in FIG. 5, and decides that a position Zp for the focusing unit that corresponds to the identified point P is an in-focus position.

When the in-focus position is decided, the observation apparatus 100 determines the reliability of this position (step S5). The operational processing unit 151 may determine the reliability of the in-focus position on the basis of a plurality of focus scores obtained for the search range or may determine the reliability of the in-focus position on the basis of this in-focus position alone. Specific methods of determining the reliability will be described hereinafter by referring to embodiments.

When determining on the basis of the determination result in step S5 that the in-focus position is reliable (YES in step S6), the observation apparatus 100 acquires an image at the in-focus position and records the acquired image (step S7). In this case, the drive control unit 152 moves the stage 110 to the in-focus position by controlling the rotation of the motor 112, then acquires an in-focus image IM1 of the object by controlling the image capturing apparatus 120, and records the in-focus image IM1 in the auxiliary storage apparatus 150c after associating this image with coordinate information.

When determining on the basis of the determination result in step S5 that the in-focus position is not reliable (NO in step S6), the observation apparatus 100 acquires and records a Z stack image (step S8). In this case, the drive control unit 152 controls the rotation of the motor 112 so as to move the stage 110 sequentially to a plurality of positions within the search range and acquires, for each of the plurality of positions, a candidate image IM2 of the object by controlling the image capturing apparatus 120, and records the candidate images IM2 in the auxiliary storage apparatus 150c after associating these candidate images with coordinate information.

A Z stack image is a set of a plurality of candidate images IM2 acquired at a plurality of positions within a search range. The range from the upper limit to lower limit of a plurality of positions at which a plurality of candidate images IM2 are acquired will hereinafter be referred to as a Z stack range. Although a Z stack range may be the same as or different from a search range, the following will describe an exemplary situation in which a search range is the same as a Z stack range.

As described above, the observation apparatus 100 determines whether an in-focus position obtained by performing AF is reliable. The observation apparatus 100 acquires a Z stack image when determining that the in-focus position is not reliable. Thus, when an in-focus position is not reliable, i.e., when AF is likely to have failed, images are acquired in a wide range in the optical-axis direction so that an image can be reliably acquired and recorded for a real in-focus position or the vicinity thereof. Hence, the observation apparatus 100 allows information necessary to observe an object to be reliably secured irrespective of success or failure of AF, thereby eliminating the need to, for example, perform image shooting again. This will be preferable especially when performing image shooting that requires a relatively long time, e.g., time-lapse image shooting, on which a long time could be spent if image shooting needs to be performed again.

The conditions for acquiring images IM in step S3 may be different from those for acquiring candidate images in step S8. For example, the number of pixels of each image IM may be smaller than that of each candidate image. Thus, in step S3, some pixels may be ignored in accordance with a specified rule when reading pixel values from the image sensor 121. Meanwhile, the unit of movement distance of the focusing unit in step S3, i.e., the search unit-distance within the screen W1, may be longer than the unit distance by which the focusing unit moves within the search range in step S8, i.e., the shortest distance among the distances between a plurality of positions at which the plurality of candidate images IM2 are acquired. In any case, the time required for AF can be reduced at high level and necessary information can be secured at high level in comparison to when images IM and candidate images are acquired using the same conditions.

In the following, descriptions will be given of specific examples of the control process performed by the observation apparatus 100.

First Embodiment

Figure 6:
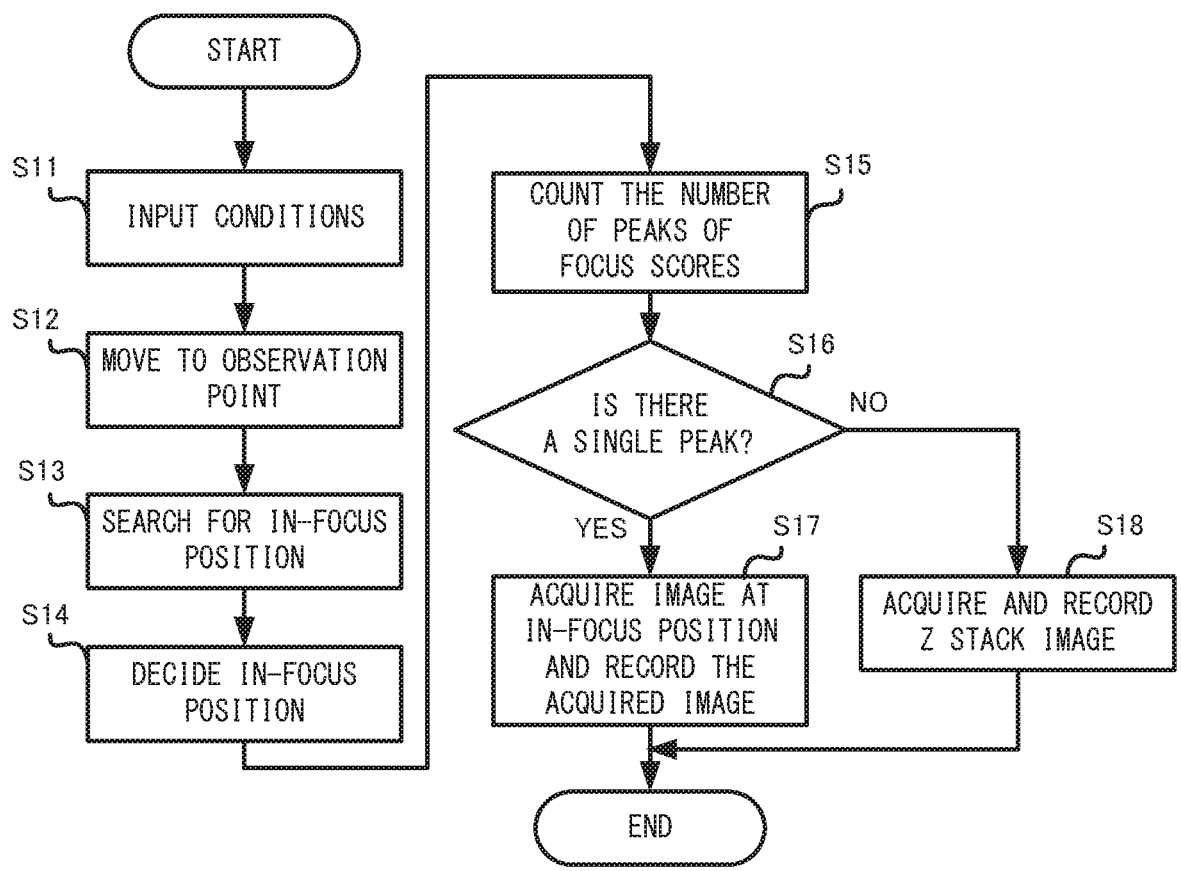
FIG. 6 is a flowchart illustrating the flow of a control process in accordance with a first embodiment.
Figure 7:
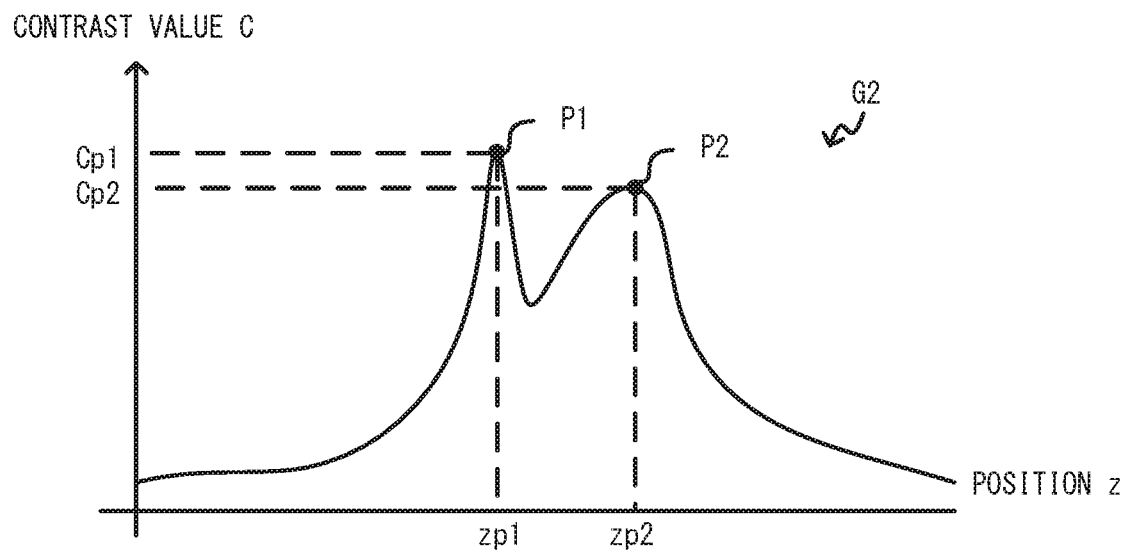
FIG. 7 illustrates an example of a contrast curve.

FIG. 6 is a flowchart illustrating the flow of a control process in accordance with the present embodiment. FIG. 7 illustrates an example of a contrast curve. The following specifically describes an example of a method of controlling the observation apparatus 100 by referring to FIGS. 6 and 7. The control process in accordance with the present embodiment is such that the reliability of an in-focus position is determined on the basis of the number of peaks of focus scores.

When the control process depicted in FIG. 6 is started, the observation apparatus 100 receives input of observation conditions (step S11). The observation apparatus 100 moves the field of view to an observation point designated as an observation condition (step S12) and performs AF (steps S13 and S14). The processes of steps S11-S14 are similar to those of steps S1-S4 depicted in FIG. 3.

When an in-focus position is decided, the observation apparatus 100 counts the number of peaks of focus scores (step S15). In particular, the observation apparatus 100 counts the number of positions for the focusing unit for which the focus scores indicate peaks. In this case, on the basis of a plurality of focus scores obtained for a search range, the operational processing unit 151 counts the number of peaks of the focus scores. When, for example, a contrast curve indicated in a graph G2 in FIG. 7 is obtained as a result of performing AF, the focus scores indicate peaks at two points P1 and P2, and thus the number of peaks is "2".

The observation apparatus 100 determines whether the number of peaks counted in step S15 is 1 (step S16). When the number of peaks is 1, the observation apparatus 100 acquires an image at the in-focus position and records the acquired image (step S17). In particular, the control unit 150 determines that the in-focus position is reliable when there is only one position for the focusing unit for which the focus score indicates a peak. When there are a plurality of peaks, the observation apparatus 100 acquires and records a Z stack image (step S18). Accordingly, when there are a plurality of positions for the focusing unit for which the focus scores indicate peaks, the control unit 150 determines that the in-focus position is not reliable. Note that the processes of steps S17 and S18 are similar to those of steps S7 and S8 depicted in FIG. 3.

As described above, the control process in accordance with the present embodiment is such that the observation apparatus 100 determines the reliability of an in-focus position on the basis of the number of peaks of focus scores. In particular, when, for example, the contrast curve has a single peak as seen in the graph G1 in FIG. 5, it is determined that the in-focus position is reliable, and an image is acquired at this in-focus position. When, for example, the contrast curve has a plurality of peaks as seen in the graph G2 in FIG. 7, it is determined that the in-focus position is not reliable, and a Z stack image is acquired. This is because contrast curves with a plurality of peaks are often provided when foreign matter such as dust is on an object to be observed, and a decided in-focus position could be a position at which the foreign matter is in focus, rather than a position at which the object is in focus.

Accordingly, even when, for example, foreign matter is on an object to be observed, the observation apparatus 100 allows information necessary for observation of the object to be reliably secured by using a Z stack image, thereby eliminating the need to perform image shooting again.

In the example described above, the reliability of an in-focus position is determined on the basis of the number of peaks on a contrast curve. However, the reliability of an in-focus position may be determined on the basis of the shape of a contrast curve. For example, it may be determined on the basis of the shape of a contrast curve whether a contrast value specific to an in-focus position is abnormal, and on the basis of a result of this determination, the reliability of the in-focus position may be determined. More specifically, when, as seen in the graph G2 in FIG. 7, the point P1 that corresponds to an in-focus position is located at a position that deviates from the overall shape of the contrast curve, contrast Cp1 may be determined as an abnormal value. In other words, the control unit 150 may determine the reliability of an in-focus position on the basis of a plurality of focus scores and can achieve, even in such a case, advantageous effects similar to those achieved when the control process depicted in FIG. 6 is performed.

The reliability of an in-focus position may be determined by comparing a contrast value specific to a peak on a contrast curve with a specified value. For example, when a contrast value specific to a peak on a contrast curve is lower than a specified value set in advance, it may be determined that the reliability of the in-focus position is low. More specifically, even in a case where a contrast curve exhibits a single peak as seen in the graph G1 in FIG. 5, when the contrast value Cp of the point P is lower than a specified value set in advance, it may be determined that the contrast Cp is abnormal, thereby determining that the reliability of the in-focus position is low.

Second Embodiment

Figure 8:
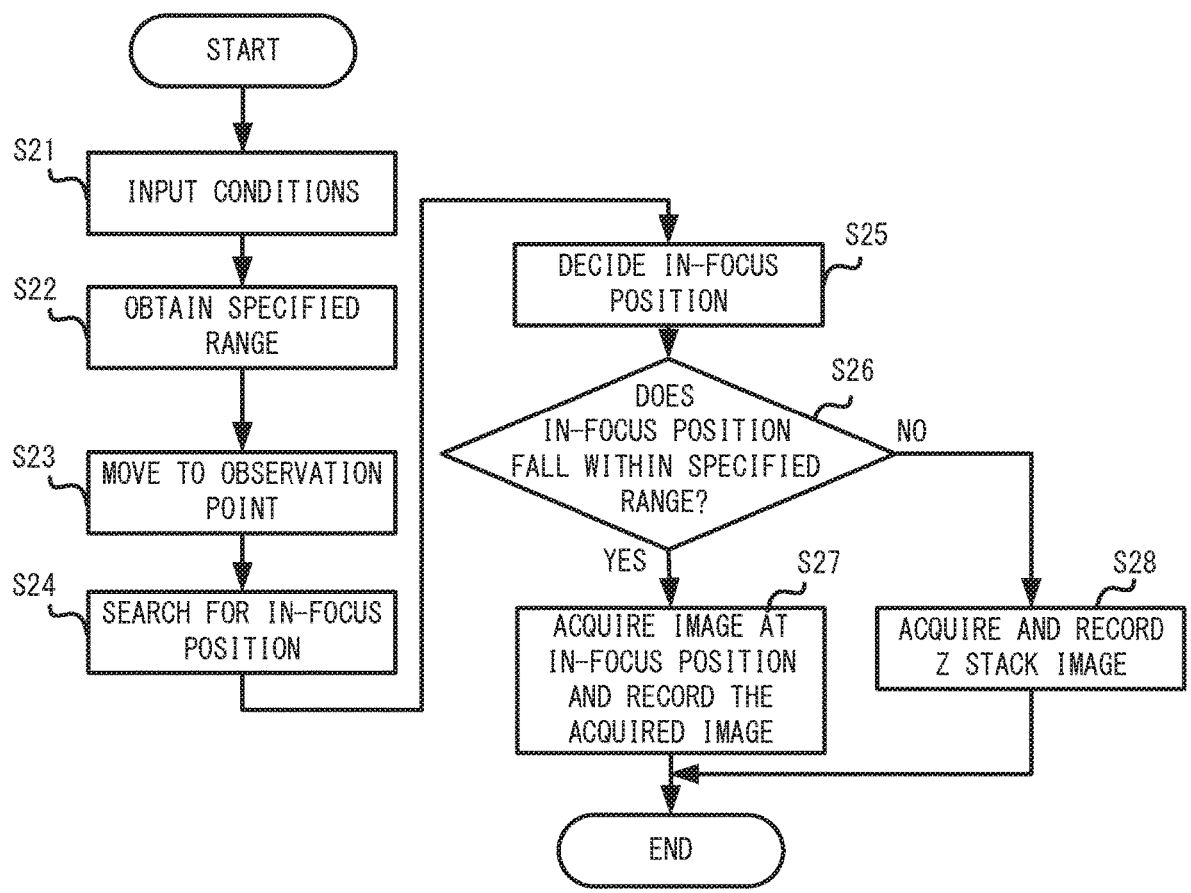
FIG. 8 is a flowchart illustrating the flow of a control process in accordance with a second embodiment.
Figure 9:
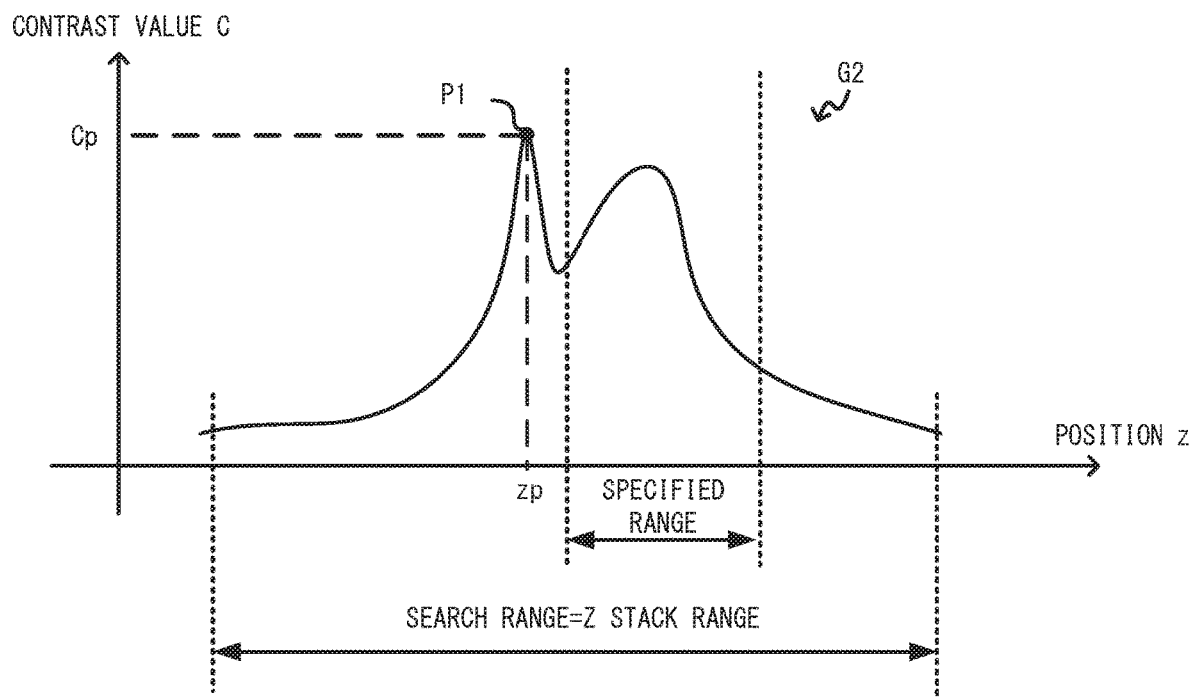
FIG. 9 is an explanatory diagram for a relationship between a search range and a specified range.

FIG. 8 is a flowchart illustrating the flow of a control process in accordance with the present embodiment. FIG. 9 is an explanatory diagram for a relationship between a search range and a specified range. The following specifically describes an example of a method of controlling the observation apparatus 100 by referring to FIGS. 8 and 9. The control process in accordance with the present embodiment is such that the reliability of an in-focus position is determined on the basis of the in-focus position alone.

When the control process depicted in FIG. 8 is started, the observation apparatus 100 receives input of observation conditions (step S21). The process of step S21 is similar to that of step S1 depicted in FIG. 3.

The observation apparatus 100 obtains a specified range (step S22). The specified range may be recorded in advance in, for example, a configuration file within the auxiliary storage apparatus 150c so that the control unit 150 can obtain the specified range set in advance from the auxiliary storage apparatus 150c. The specified range is a position range set in advance for the focusing unit in which the focusing unit in an in-focus state is estimated to be present, and is also a portion of the search range, as depicted in FIG. 9.

The observation apparatus 100 moves the field of view to an observation point designated as an observation condition (step S23) and performs AF (steps S24 and S25). The processes of steps S23-S25 are similar to those of steps S2-S4 depicted in FIG. 3.

When an in-focus position is decided, the observation apparatus 100 determines whether the in-focus position falls within the specified range (step S26). In this case, the control unit 150 determines whether the in-focus position falls within the specified range by comparing the specified range obtained in step S22 with the in-focus position decided in step S25.

When the in-focus position falls within the specified range, the observation apparatus 100 acquires an image at the in-focus position and records the acquired image (step S27). Accordingly, when the in-focus position falls within the specified range, the control unit 150 determines that the in-focus position is reliable. When the in-focus position does not fall within the specified range, the observation apparatus 100 acquires and records a Z stack image (step S28). Thus, the control unit 150 determines that the in-focus position is not reliable when the in-focus position does not fall within the specified range. Note that the processes of steps S27 and S28 are similar to those of steps S7 and S8 depicted in FIG. 3.

As described above, the control process in accordance with the present embodiment is such that the observation apparatus 100 determines the reliability of an in-focus position on the basis of whether the in-focus position falls within a specified range. In particular, as the specified range is, as described above, a range in which the focusing unit in an in-focus state is estimated to be present, when the in-focus position does not fall within the specified range, it is determined that the in-focus position is not reliable, and a Z stack image is acquired.

Accordingly, the observation apparatus 100 can perform the control process in accordance with the present embodiment, so that when an obviously inappropriate position is accidentally identified as an in-focus position, a Z stack image can be acquired to reliably secure information necessary to observe an object, thereby eliminating the need to, for example, perform image shooting again.

Third Embodiment

Figure 10:
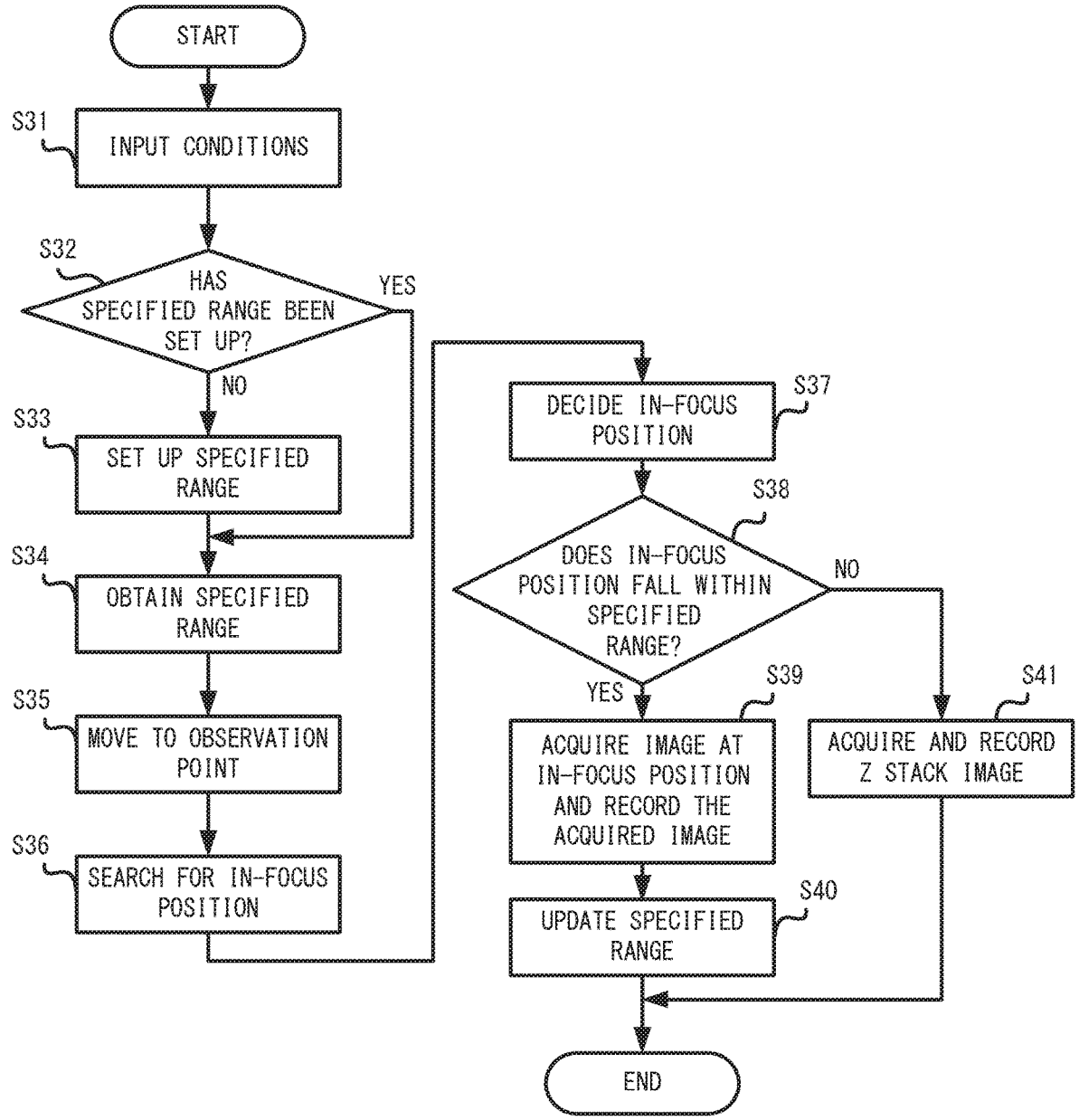
FIG. 10 is a flowchart illustrating the flow of a control process in accordance with a third embodiment.
Figure 11:
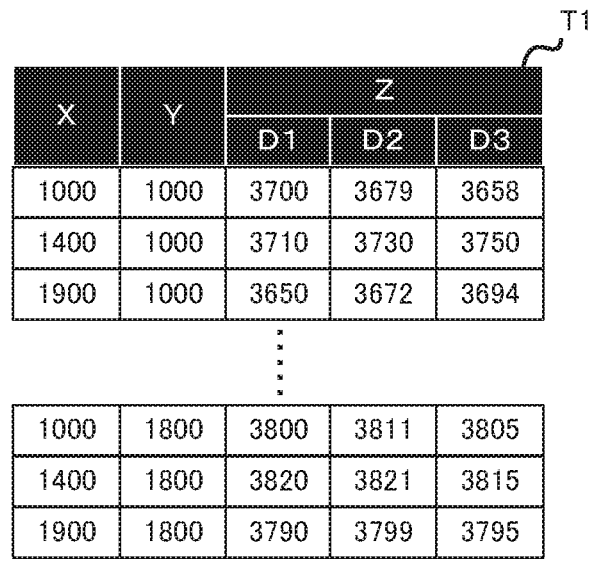
FIG. 11 exemplifies a table T1 that includes coordinate information of in-focus positions.
Figure 12:
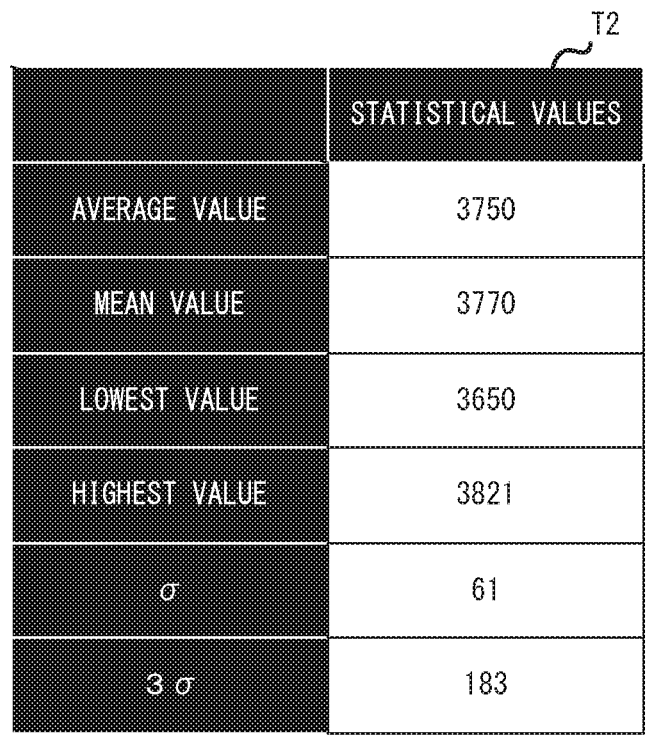
FIG. 12 exemplifies a table T2 that includes statistical information pertaining to in-focus positions.

FIG. 10 is a flowchart illustrating the flow of a control process in accordance with the present embodiment. FIG. 11 exemplifies a table T1 that includes coordinate information of in-focus positions. FIG. 12 exemplifies a table T2 that includes statistical information pertaining to in-focus positions. FIG. 13 exemplifies a table T3 that includes information on a specified range. The following specifically describes an example of a method of controlling the observation apparatus 100 by referring to FIGS. 10-13. The control process in accordance with the present embodiment is such that the reliability of an in-focus position is determined using information on in-focus positions decided in the past.

When the control process depicted in FIG. 10 is started, the observation apparatus 100 receives input of observation conditions (step S31). Note that the process of step S31 is similar to that of step S1 depicted in FIG. 3.

The observation apparatus 100 determines whether a specified range has been set up (step S32). In this case, the control unit 150 determines whether the table T3, which is created in the auxiliary storage apparatus 150c, has information recorded therein. The table T3 stores a specified range calculated on the basis of in-focus positions obtained through AF performed in the past.

When it is determined in step S32 that information is not recorded, the observation apparatus 100 sets up a specified range (step S33). In this case, first, the control unit 150 performs AF a plurality of times. In particular, the control unit 150 performs AF a plurality of times for each of a plurality of different observation points and records coordinate information that includes observation points (X, Y) and in-focus positions (Z) in the table T1, which is created in the auxiliary storage apparatus 150c. FIG. 11 indicates an example in which the table T1 records coordinate information obtained by performing AF three times for each of the plurality of observation points. In addition, the control unit 150 calculates statistical information on the basis of the information recorded in the table T1 and records this information in the table T2, which is created in the auxiliary storage apparatus 150c. FIG. 12 indicates an example in which an average value, a mean value, a lowest value, a highest value, σ (standard deviation), and 3σ (standard deviation multiplied by three) are recorded in the table T2 as statistical values. Finally, the control unit 150 calculates a specified range on the basis of the statistical values recorded in the table T2 and records this range in the table T3 created in the auxiliary storage apparatus 150c. FIG. 13 indicates an example in which the table T3 records a specified range from the average value minus 3σ to the average value plus 3σ.

When it is determined in step S32 that a specified range has been set up or when step S33 is finished, the observation apparatus 100 obtains a specified range (step S34). In this case, the control unit 150 obtains a specified range by reading the same from the table T3.

The observation apparatus 100 moves the field of view to an observation point designated as an observation condition (step S35) and performs AF (steps S36 and S37). The observation apparatus 100 determines whether the in-focus position falls within the specified range (step S38). The processes of steps S35-S38 are similar to those of steps S23-S26 depicted in FIG. 8.

When the in-focus position falls within the specified range, the observation apparatus 100 acquires an image at the in-focus position and records the acquired image (step S39). Note that the process of step S39 is similar to that of step S27 depicted in FIG. 8.

The observation apparatus 100 updates the specified range (step S40). In this case, the control unit 150 adds, to the table T1, coordinate information that includes the observation point to which the field of view was moved in step S35 and the in-focus position decided in step S37. In addition, the statistical information in the table T2 and the specified range in the table T3 are updated on the basis of the information recorded in the table T1.

When the in-focus position does not fall within the specified range, the observation apparatus 100 acquires and records a Z stack image (step S41). Note that the process of step S41 is similar to that of step S28 depicted in FIG. 8.

As described above, the control process in accordance with the present embodiment is such that the observation apparatus 100 determines the reliability of an in-focus position on the basis of whether the in-focus position falls within a specified range. Unlike in the control process in accordance with the second embodiment, however, the specified range is calculated by statistically processing the history of in-focus positions decided by the control unit 150 in the past. The history of in-focus positions decided by the control unit 150 in the past may include a plurality of in-focus positions associated with a plurality of observation points. In particular, the history of in-focus positions may include a first in-focus position decided on the basis of a plurality of images of an object to be observed acquired by the image capturing apparatus 120 when the XY driving unit is located at a first position and a second in-focus position decided on the basis of a plurality of images of the object acquired by the image capturing apparatus 120 when the XY driving unit is located at a second position different from the first position.

Accordingly, the observation apparatus 100 may more accurately determine the reliability of an in-focus position by performing the control process in accordance with the present embodiment than by performing the control process in accordance with the second embodiment. Hence, the observation apparatus 100 can more reliably secure information necessary to observe an object, thereby eliminating the need to, for example, perform image shooting again. In addition, a specified range is updated every time a reliable in-focus position is decided so that the accuracy in the specified range can be expected to be improved.

The above-described specified range may be provided at least for each combination of the type of an object to be observed and a container for accommodating the object, and the control unit 150 may determine that the in-focus position is not reliable when the in-focus position does not fall within a specified range that depends on the combination. This is because differences in type between objects to be observed could result in variations in in-focus positions due to differences in size between the objects, and differences between containers for accommodating objects to be observed could result in variations in in-focus positions due to differences in thickness between the containers. Providing a specified range for each of such combinations allows the reliabilities of in-focus positions to be determined more accurately. Note that a container and the type of an object to be observed can be identified on the basis of input of observation conditions.

In the example indicated above, when a specified range calculated by statistically processing the history of in-focus positions (hereinafter referred to as a statistical specified range) is not set up, AF is performed a plurality of times to set up a statistical specified range. However, another process may be performed. For example, when a statistical specified range is not set up, the specified ranges recorded in the table T4 in FIG. 14 that are each set up in advance at least for each combination of the type of an object to be observed and a container for containing the object may be obtained. The specified range in this case may be, for example, a position range in which the focusing unit in an in-focus state is estimated to be present, as in the second embodiment.

Fourth Embodiment

FIG. 15 is a flowchart illustrating the flow of a control process in accordance with the present embodiment. The following specifically describes an example of a method of controlling the observation apparatus 100 by referring to FIG. 15. The control process in accordance with the present embodiment is different from the control process in accordance with the third embodiment in that the former process is adapted also for a situation in which a plurality of observation points are input as observation conditions.

Steps S51-S58 depicted in FIG. 15 are similar to steps S31-S38 depicted in FIG. 10. After step S58, when an in-focus position falls within a specified range, the observation apparatus 100 acquires an image at the in-focus position and records the acquired image (step S59). The observation apparatus 100 updates the history of in-focus positions (step S60). In particular, new coordinate information is added to the table T1. When the in-focus position does not fall within the specified range, the observation apparatus 100 acquires and records a Z stack image (step S61). Note that the processes of steps S59 and S61 are similar to those of steps S39 and S41 depicted in FIG. 10.

The observation apparatus 100 determines whether images have been acquired for all observation points (step S62) and repeats the processes of steps S55-S62 until images are acquired for all observation points. The observation apparatus 100 updates the specified range after determining that images have been acquired for all observation points (step S63). In this case, the control unit 150 updates the specified range by updating the tables T2 and T3 on the basis of the table T1 updated in step S60.

The observation apparatus 100 may accurately determine the reliability of an in-focus position by performing the control process in accordance with the present embodiment, as in the case of performing the control process in accordance with the third embodiment. Hence, the observation apparatus 100 can reliably secure information necessary to observe an object, thereby eliminating the need to, for example, perform image shooting again.

In addition, when the user designates a plurality of observation points, the observation apparatus 100 can reliably obtain information for all of the observation points by performing the control process in accordance with the present embodiment. Moreover, since a specified range is updated after images are obtained for all observation points, the reliability of an in-focus position can be determined under the same condition for all observation points.

Fifth Embodiment

Figure 16:
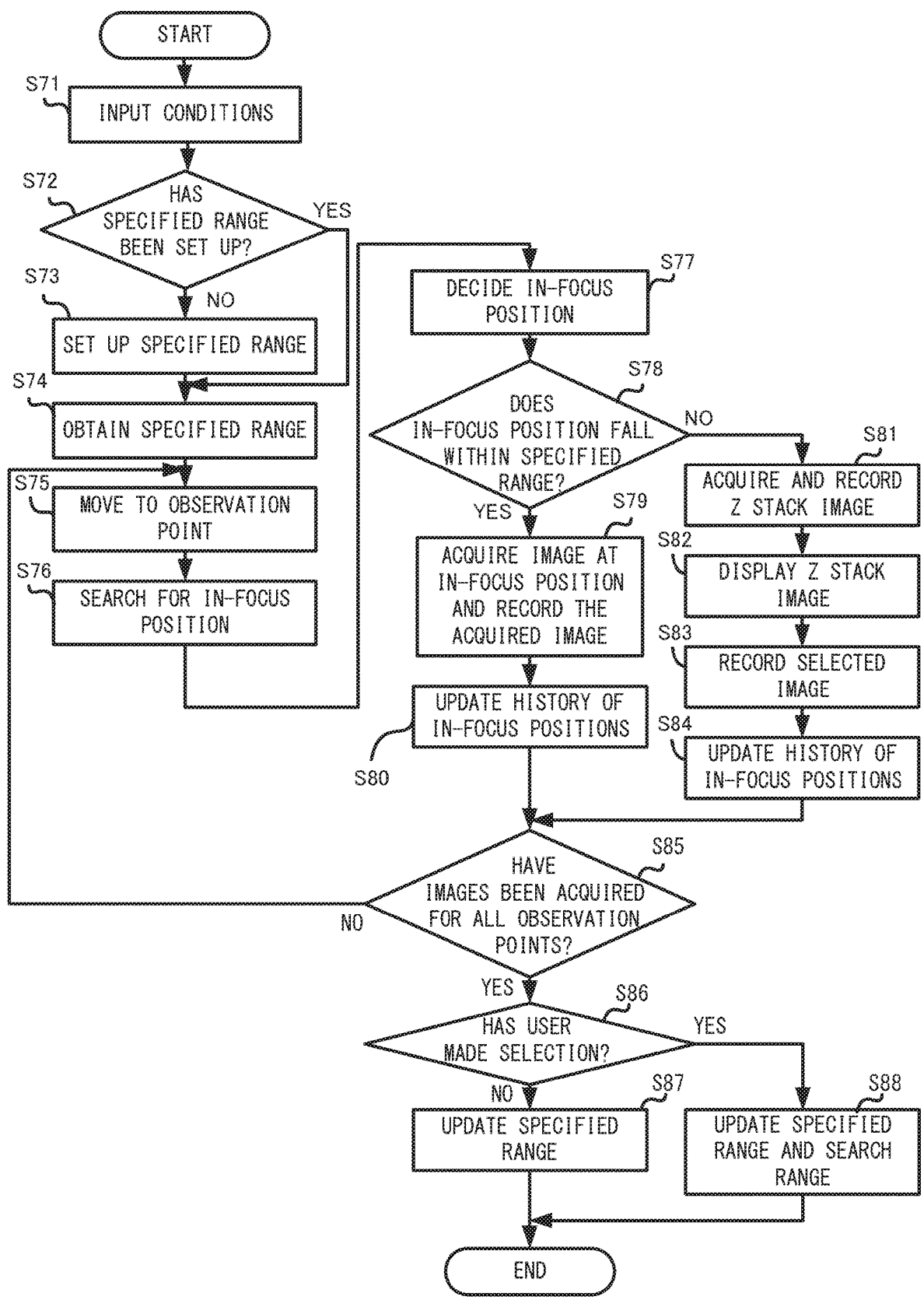
FIG. 16 is a flowchart illustrating the flow of a control process in accordance with a fifth embodiment.
Figure 17:
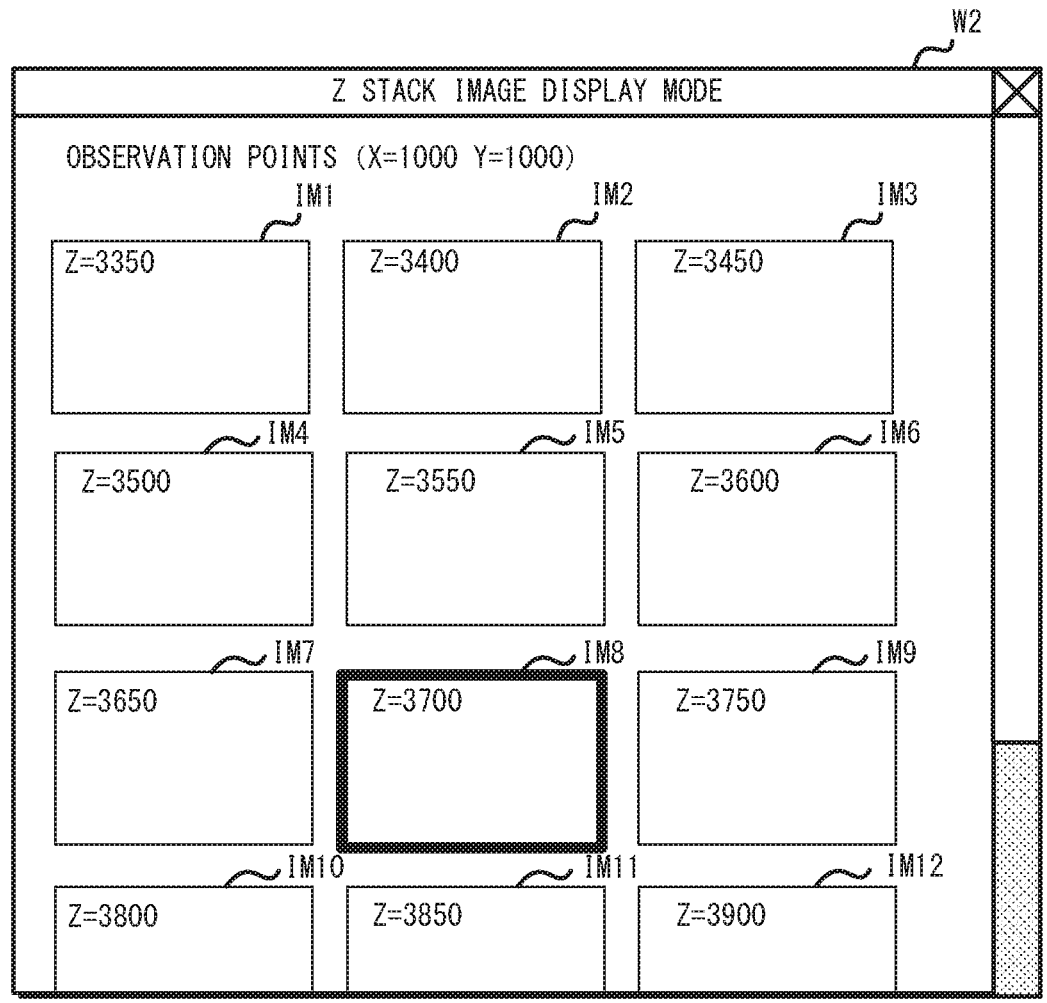
FIG. 17 illustrates an example of a Z stack display screen.
Figure 18:
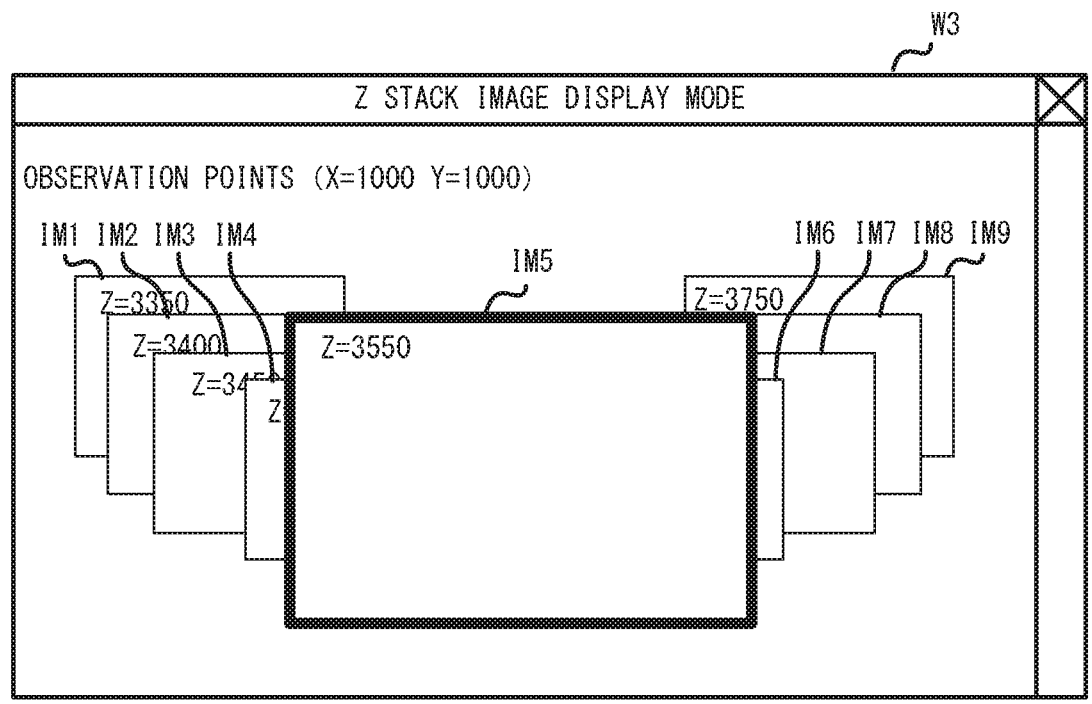
FIG. 18 illustrates another example of a Z stack display screen.
Figure 20:
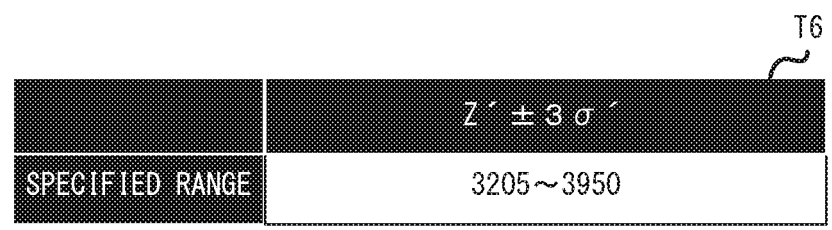
FIG. 20 exemplifies a table T6 that includes information on a specified range.

FIG. 16 is a flowchart illustrating the flow of a control process in accordance with the present embodiment. FIG. 17 illustrates an example of a Z stack display screen. FIG. 18 illustrates another example of a Z stack display screen. FIG. 19 exemplifies a table T5 that includes information on specified ranges. FIG. 20 exemplifies a table T6 that includes information on a specified range. The following specifically describes an example of a method of controlling the observation apparatus 100 by referring to FIGS. 16-20. The control process in accordance with the present embodiment is different from the control process in accordance with the forth embodiment in that when a Z stack image is acquired, the user selects an image acquired during an in-focus state from the Z stack image.

Steps S71-S81 in the control process depicted in FIG. 16 are similar to steps S51-S61 depicted in FIG. 15.

After step S81, the observation apparatus 100 displays a Z stack image (step S82). In this case, for example, the control unit 150 may cause the display apparatus 10 to display a Z stack image comprising a plurality of candidate images acquired at a plurality of positions in step S81, as depicted in FIG. 17. FIG. 17 illustrates that a list of a plurality of candidate images (images IM1-IM12) is displayed on a screen W2, i.e., a Z stack display screen. FIG. 17 also indicates that the user has selected an image IM8 as an image acquired during an in-focus state from the image group displayed as a list on the screen W2.

In step S82, the observation apparatus 100 does not necessarily need to concurrently display the plurality of candidate images acquired at a plurality of positions. For example, as depicted in FIG. 18, the plurality of candidate images may be sequentially displayed one by one on the display apparatus 10 in accordance with operations performed on the screen by the user. FIG. 18 illustrates selecting a candidate image to be displayed on the screen W3 from the plurality of candidate images by swiping the screen W3.

When the user selects one candidate image from the Z stack image in step S82 and the selection is confirmed, the observation apparatus 100 records the selected candidate image (hereinafter referred to as a selected image) (step S83). In this case, the control unit 150 records the candidate image selected in step S82 in the auxiliary storage apparatus 150c after associating this image with coordinate information.

In addition, the observation apparatus 100 updates the history of in-focus positions (step S84). In this case, the control unit 150 identifies, as an in-focus position, the position at which the focusing unit was located when the selected image was acquired and adds new coordinate information to the table T1.

The observation apparatus 100 determines whether images have been acquired for all observation points (step S85) and repeats the processes of steps S75-S85 until images are acquired for all observation points.

When determining that images have been acquired for all observation points, the observation apparatus 100 determines whether there is a selected image that has been recorded in accordance with a selecting operation performed by the user (step S86). In this case, the control unit 150 determines whether such an image is present in accordance with whether the image recording process in step S83 has been performed at least once.

When there are no selected images that have been recorded in accordance with a selecting operation performed by the user (NO in step S86), i.e., when it is determined that the in-focus position is reliable for all observation points, the observation apparatus 100 updates the specified range (step S87). Note that the process of step S87 is similar to that of step S63 in FIG. 15.

When there is a selected image that has been recorded in accordance with a selecting operation performed by the user (YES in step S86), i.e., when it is determined that the in-focus position is not reliable for at least one observation point, the observation apparatus 100 updates both the specified range and the search range (step S88). In this case, the control unit 150 calculates, on the basis of the coordinate information recorded in the table T1, a standard deviation $\sigma'$ for a position $Z'$ at which the focusing unit was located when the selected image was acquired, i.e., the position identified as the in-focus position in step S84, and updates $\sigma$ and $3\sigma$ in the table T2 to $\sigma'$ and $3\sigma'$, respectively. The specified range in the table T3 is updated to the range from $Z'$ minus $3\sigma'$ to $Z'$ plus $3\sigma'$. In addition, the control unit 150 updates the search range to a narrower range that includes the position $Z'$ as the center thereof. For example, the search range may be decreased by a certain amount determined in advance.

The observation apparatus 100 can perform the control process in accordance with the present embodiment so as to achieve advantageous effects similar to those achieved when the control process in accordance with the fourth embodiment is performed.

Meanwhile, the present embodiment is such that when it is determined that an in-focus position is not reliable, the observation apparatus 100 displays a Z stack image (a plurality of candidate images) on the display apparatus 10 so as to allow the user to select a candidate image acquired during an in-focus state, and the observation apparatus 100 records the selected image. Hence, appropriate images included in the Z stack image can be managed separately from the other images.

In addition, the present embodiment is such that when one candidate image is selected from a plurality of candidate images displayed on the display apparatus 10, the observation apparatus 100 updates the specified range on the basis of the position of the focusing unit that corresponds to the selected one candidate image. Thus, a specified range can be set up under a condition in which the position at which the focusing unit was located when the candidate image selected by the user was acquired is evaluated more highly than the in-focus position decided through AF. Accordingly, the reliability of an in-focus position can be determined according to a standard that the user determines desirable.

When it is determined that an in-focus position is not reliable for a plurality of observation points, a standard deviation $\sigma'$ may be calculated for positions $Z'$ associated with the observation points, and a plurality of specified ranges ($Z'$ minus $3\sigma'$ to $Z'$ plus $3\sigma'$) may be recorded in the table T5, as depicted in FIG. 19. Under this condition, the smallest range that covers the plurality of specified ranges recorded in the table T5 may be set as a specified range. FIG. 20 depicts a table T6 that records a specified range calculated using the above-described procedure.

Sixth Embodiment

Figure 21:
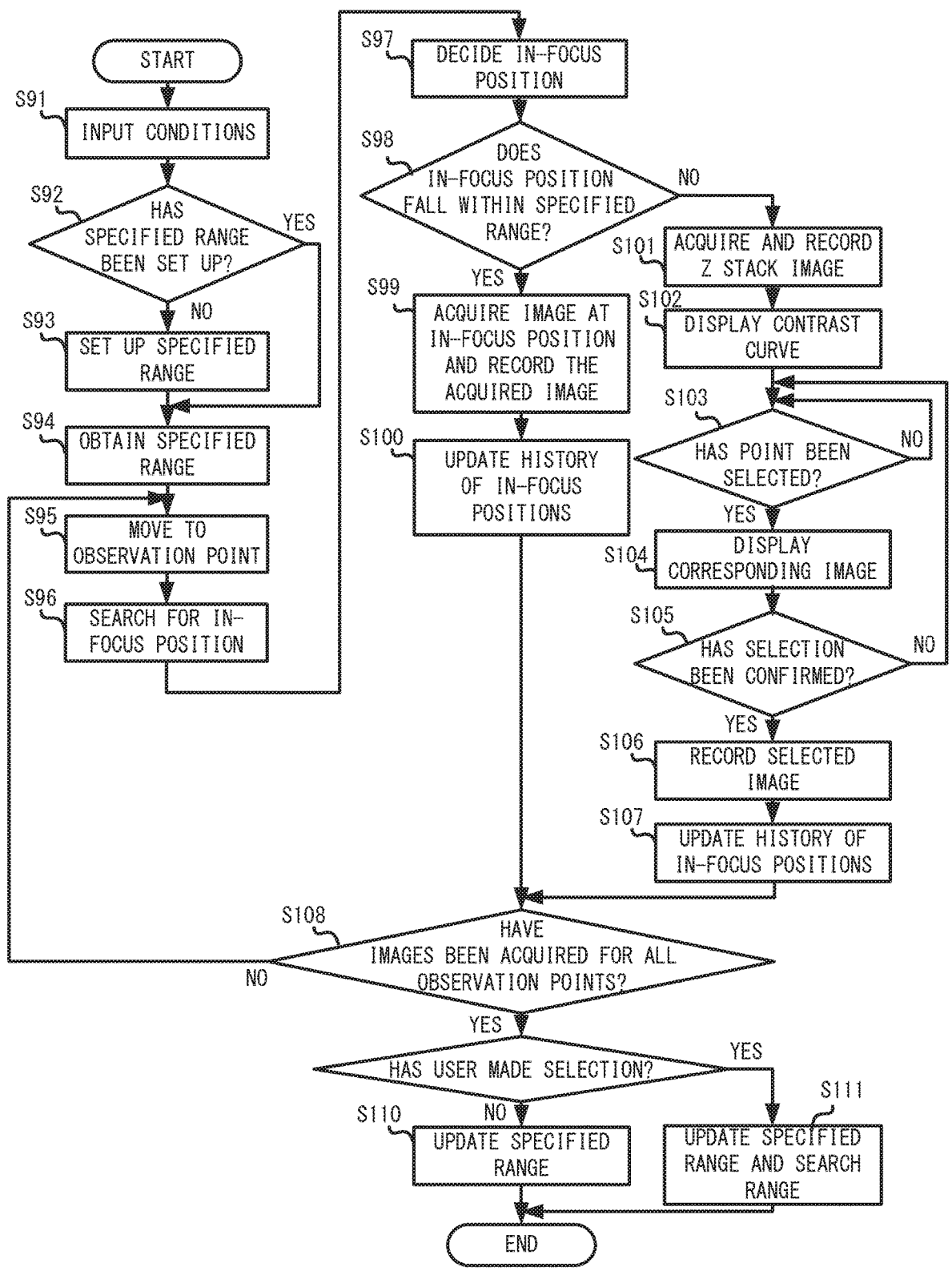
FIG. 21 is a flowchart illustrating the flow of a control process in accordance with a sixth embodiment.

FIG. 21 is a flowchart illustrating the flow of a control process in accordance with the present embodiment. FIG. 22 illustrates still another example of a Z stack display screen. The following specifically describes an example of a method of controlling the observation apparatus 100 by referring to FIGS. 21 and 22. The method for displaying a Z stack image in the control process in accordance with the present embodiment is different from that in the control process in accordance with the fifth embodiment.

Steps S91-S101 in the control process depicted in FIG. 21 are similar to steps S71-S81 depicted in FIG. 16.

After step S101, the observation apparatus 100 displays a contrast curve (step S102). In this case, first, the control unit 150 calculates a plurality of focus scores (contrast values) on the basis of a plurality of candidate images acquired at a plurality of positions in step S101. Then, the control unit 150 causes the display apparatus 10 to display a graph in which a plurality of points that correspond to the plurality of focus scores calculated on the basis of the plurality of candidate images are plotted within a coordinate space having axes indicating the position of the focusing unit and the focus scores (contrast value). A screen W4 in FIG. 22 is an example of the screen displayed on the display apparatus 10 in step S102. The screen W4 includes a graph G3 indicating a contrast curve created on the basis of a Z stack image.

When a contrast curve is displayed, the observation apparatus 100 determines whether a point on the contrast curve has been selected (step S103) and, when determining that such a point has been selected, displays a candidate image that corresponds to this point on the display apparatus 10 (step S104). In this case, the control unit 150 causes the display apparatus 10 to display a candidate image that corresponds to a point selected on the graph. A screen W5 in FIG. 22 is an example of the screen displayed on the display apparatus 10 in step S104. The screen W5 includes the graph G3 indicating the contrast curve and a candidate image IMa that corresponds to a point Pa selected on the graph G3.

In addition, the observation apparatus 100 determines whether selection has been confirmed (step S105). In this case, the control unit 150 determines whether the user has performed a confirmation operation by using the input apparatus 20. When determining that the selection has not been confirmed, the control unit 150 repeats the processes of steps S103-S105 until the selection is confirmed. A screen W6 in FIG. 22 is an example of the screen displayed in step S104 when a point Pb on the graph G3 is selected in step S103 and includes a candidate image IMb that corresponds to the point Pb.

When selection has been confirmed, the observation apparatus 100 records a candidate image (selected image) displayed at the time of the confirmation (step S106) and updates the history of in-focus positions (step S107). Note that the process of step S107 is similar to that of step S84 in FIG. 16.

The processes of steps S108-S111 to be performed next are similar to those of steps S85-S88 in FIG. 16. Thus, when the selection on the graph is confirmed, the control unit 150 updates the specified range on the basis of the position of the focusing unit that corresponds to the selected point.

The observation apparatus 100 can perform the control process in accordance with the present embodiment so as to achieve advantageous effects similar to those achieved when the control process in accordance with the fifth embodiment is performed.

In the present embodiment, an image acquired during an in-focus state can be identified efficiently by selecting images while viewing a graph such as a contrast curve. Hence, an image acquired during an in-focus state can be identified in a shorter time than in the control process in accordance with the fifth embodiment, thereby decreasing workload on the user.

The embodiments described above indicate specific examples to facilitate understanding of the invention, and the present invention is not limited to these embodiments. Some of or all of the embodiments described above may be applied to other embodiments so as to provide still other embodiments of the invention. Various modifications or changes can be made to the observation apparatus, the control method, and the computer-readable medium without departing from the recitation in the claims.

Although embodiments were described above with reference to examples in which the observation apparatus 100 and observation system 1 depicted in FIG. 1 perform control processes, the display apparatus 10 and the observation system 1 are not the only observation apparatus and observation system that can perform the control processes. The control processes may be performed by the observation apparatuses and observation systems depicted in FIGS. 23-25.

An observation system 2 depicted in FIG. 23 is different from the observation system 1 depicted in FIG. 1 in that the observation system 2 includes an observation apparatus 101, in place of the observation apparatus 100, and an operational processing apparatus 30. The observation apparatus 101 is different from the observation apparatus 100 in that the observation apparatus 101 includes a drive control unit 160 in place of the control unit 150 and does not include a component that corresponds to the operational processing unit 151. The drive control unit 160 corresponds to the drive control unit 152. The observation system 2 includes the operational processing apparatus 30, which corresponds to the operational processing unit 151. The operational processing apparatus 30 is communicably connected to the observation apparatus 101. The observation apparatus 101 and the operational processing apparatus 30 may be together deemed as an observation apparatus. Both the observation system 2 and the observation apparatus 101 depicted in FIG. 23 can perform the control processes in accordance with the above-described embodiments and achieve advantageous effects similar to those achieved by the observation system 1 and the observation apparatus 100.

Figure 24:
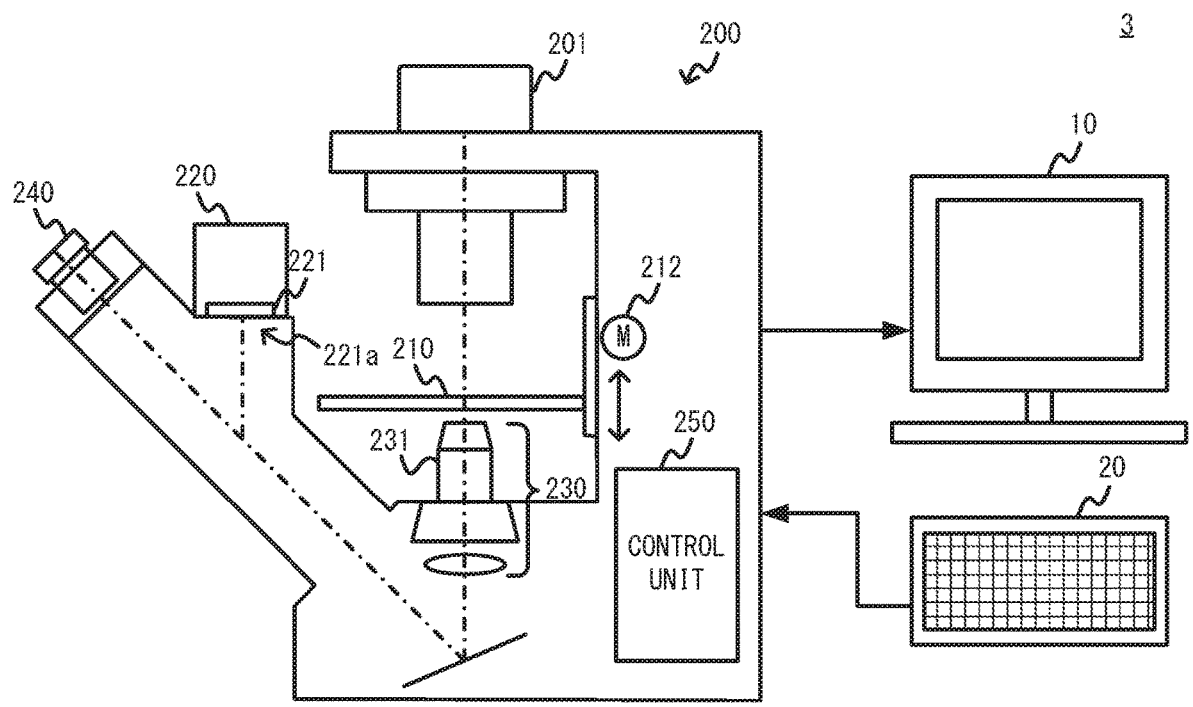
FIG. 24 exemplifies the configuration of an observation system 3.

The observation system 3 depicted in FIG. 24 is different from the observation system 1 depicted in FIG. 1 in that the observation system 3 includes an observation apparatus 200 in place of the observation apparatus 100. The observation apparatus 200 is different from the observation apparatus 100 in that the observation apparatus 200 is an inverted microscope. The observation apparatus 200 includes a stage 210, an image capturing apparatus 220, an image formation optical system 230, an objective 231, an eyepiece 240, and a control unit 250, which respectively correspond to the stage 110, image capturing apparatus 120, image formation optical system 130, objective 131, eyepiece 140, and control unit 150 of the observation apparatus 100. The observation apparatus 200 also includes an image sensor 221, an imaging surface 221a, and a motor 212, which respectively correspond to the image sensor 121, the imaging surface 121a, and the motor 112. The observation apparatus 200 further includes an epi-illumination light source 201. The observation system 3 and the observation apparatus 200 depicted in FIG. 24 can also perform the control processes in accordance with the above-described embodiments and achieve advantageous effects similar to those achieved by the observation system 1 and the observation apparatus 100.

An observation system 4 depicted in FIG. 25 is different from the observation system 1 depicted in FIG. 1 in that the observation system 4 includes an observation apparatus 300, in place of the observation apparatus 100, and a control apparatus 310. For example, the observation apparatus 300 may be placed in an incubator, and observe cultured cells under a managed culture environment. The observation apparatus 300 includes a light source 301 that illuminates cultured cells accommodated in a culture container placed on the upper surface of a housing in the observation apparatus 300, i.e., illuminates an objected to be observed. An image capturing apparatus 302 captures an image of the cultured cells on the basis of light reflected from the cultured cells. The light source 301 and the image capturing apparatus 302 of the observation apparatus 300 are not coaxial with each other, and thus the illumination provided by the observation apparatus 300 acts similarly to oblique illumination. A motor 303 moves the image capturing apparatus 302 or an optical system (not illustrated) so as to adjust the distance between the optical system and an object to be observed. The control apparatus 310 controls the observation apparatus 300 and corresponds to the control unit 150 of the observation apparatus 100. The observation system 4 and the observation apparatus 300 depicted in FIG. 25 can also perform the control processes in accordance with the above-described embodiments and achieve advantageous effects similar to those achieved by the observation system 1 and the observation apparatus 100.

As depicted in FIGS. 23-25, the illumination method used by the observation apparatus is not particularly limited, and any illumination method such as coaxial epi-illumination, transmitted illumination, or oblique illumination may be used.

Embodiments have been described with reference to examples in which a certain unit distance input on the condition input screen is used as a search unit-distance. However, the search unit-distance in AF may be adjusted, as appropriate, in accordance with, for example, a contrast curve created on the basis of a Z stack image. A short search unit-distance may be set for portions of a contrast curve close to a peak while setting a long search unit-distance for portions of the contrast curve distant from the peak, thereby decreasing the time required for AF. In particular, the control unit 150 may calculate a plurality of focus scores on the basis of a plurality of candidate images acquired at a plurality of positions after determining that an in-focus position is not reliable, and update a search range and the drive unit-distance (i.e., search unit-distance) of the focusing unit for the search range on the basis of the combinations of the plurality of positions and the plurality of focus scores.

What is claimed is:

1. An observation apparatus comprising:
    an image sensor that includes an imaging surface and acquires a plurality of images of an object to be observed;
    an optical system that projects an optical image of the object onto the image sensor;
    a stage on which the object is placed;
    a focusing unit having an actuator configured to adjust, with reference to an optical-axis direction of the optical system, a relative positional relationship between the stage and the optical system; and
    a processor comprising hardware, the processor being configured to control at least the image sensor and the focusing unit; and
    wherein the processor is configured to:
        determine an in-focus position for the focusing unit based on the plurality of images of the object acquired by the image sensor, the plurality of images each being an image acquired when the focusing unit is located at a different position,
        determine a reliability of the determined in-focus position, and
        when determining that the in-focus position is not reliable, control the focusing unit sequentially to a plurality of positions and cause the image sensor to acquire, for each of the plurality of positions, a candidate image of the object,
        wherein the control of the focusing unit adjusts a distance between the stage and the optical system in the optical-axis direction of the optical system.

2. The observation apparatus of claim 1, wherein the processor is further configured to:
    calculate a plurality of focus scores based on the plurality of images, and
    determine the reliability of the in-focus position based on the plurality of focus scores.

3. The observation apparatus of claim 2, wherein the processor determines that the in-focus position is not reliable when there are a plurality of positions for the focusing unit for which the focus scores indicate peaks.

4. The observation apparatus of claim 1, wherein the processor determines that the in-focus position is not reliable when the in-focus position does not fall within a specified range,
    where the specified range is a position range set in advance for the focusing unit in which the focusing unit in an in-focus state is estimated to be present.

5. The observation apparatus of claim 2, wherein the processor determines that the in-focus position is not reliable when the in-focus position does not fall within a specified range,
    where the specified range is a position range set in advance for the focusing unit in which the focusing unit in an in-focus state is estimated to be present.

6. The observation apparatus of claim 3, wherein the processor determines that the in-focus position is not reliable when the in-focus position does not fall within a specified range,
    where the specified range is a position range set in advance for the focusing unit in which the focusing unit in an in-focus state is estimated to be present.

7. The observation apparatus of claim 4, wherein the position range is calculated for the focusing unit by statistically processing history of in-focus positions determined by the processor.

8. The observation apparatus of claim 5, wherein the position range is calculated for the focusing unit by statistically processing history of in-focus positions determined by the processor.

9. The observation apparatus of claim 6, wherein the position range is calculated for the focusing unit by statistically processing history of in-focus positions determined by the processor.

10. The observation apparatus of claim 7, further comprising:
    a second actuator configured to move the object in an X-Y plane orthogonal to the optical-axis direction of the optical system, wherein
    the history of in-focus positions determined by the processor includes a first in-focus position determined based on a plurality of images of the object acquired by the image sensor when the stage is located at a first position in the X-Y plane and a second in-focus position determined based on a plurality of images of the object acquired by the image sensor when the stage is located at a second position in the X-Y plane different from the first position.

11. The observation apparatus of claim 8, further comprising:
    a second actuator configured to move the object in an X-Y plane orthogonal to the optical-axis direction of the optical system, wherein
    the history of in-focus positions determined by the processor includes a first in-focus position determined based on a plurality of images of the object acquired by the image sensor when the stage is located at a first position in the X-Y plane and a second in-focus position determined based on a plurality of images of the object acquired by the image sensor when the stage is located at a second position in the X-Y plane different from the first position.

12. The observation apparatus of claim 9, further comprising:
a second actuator configured to move the object in an X-Y plane orthogonal to the optical-axis direction of the optical system, wherein
the history of in-focus positions determined by the processor includes a first in-focus position determined based on a plurality of images of the object acquired by the image sensor when the stage is located at a first position in the X-Y plane and a second in-focus position determined based on a plurality of images of the object acquired by the image sensor when the stage is located at a second position different from the first position.

13. The observation apparatus of claim 7, wherein
the position range is provided at least for each combination of a type of the object and a container for accommodating the object, and
the processor determines that the in-focus position is not reliable when the in-focus position does not fall within the position range that depends at least on a combination of the type of the object and the container for accommodating the object.

14. The observation apparatus of claim 4, wherein the processor is further configured to:
display a plurality of candidate images acquired at the plurality of positions, and
when one candidate image is selected from the displayed plurality of candidate images, update the position range based on a position of the focusing unit that corresponds to the selected one candidate image.

15. The observation apparatus of claim 4, wherein the processor is further configured to:
calculate a plurality of focus scores based on a plurality of candidate images acquired at the plurality of positions,
display a graph in which a plurality of points that correspond to the plurality of focus scores calculated based on the plurality of candidate images are plotted within a coordinate space having axes indicating a position of the focusing unit and a focus score,
display a candidate image that corresponds to a point selected on the graph, and
when a selection on the graph is confirmed, update the position range based on a position of the focusing unit that corresponds to the selected point.

16. The observation apparatus of claim 1, wherein the processor is further configured to:
calculate a plurality of focus scores based on a plurality of candidate images acquired at the plurality of positions, and
based on combinations of the plurality of positions and the plurality of focus scores, update a search range in which the in-focus position is to be searched for and a drive unit-distance of the focusing unit within the search range.

17. An observation apparatus comprising:
an image sensor that includes an imaging surface and acquires a plurality of images of an object to be observed;
an optical system that projects an optical image of the object onto the image sensor:
a stage on which the object is placed;
a focusing unit having an actuator configured to adjust, with reference to an optical-axis direction of the optical system, a relative positional relationship between the stage and a surface optically conjugate to the imaging surface; and
a processor comprising hardware, the processor being configured to control at least the image sensor and the actuator; and
wherein the processor is configured to:
determine an in-focus position for the focusing unit based on the plurality of images of the object acquired by the image sensor, the plurality of images each being an image acquired when the focusing unit is located at a different position,
determine a reliability of the determined in-focus position, and
when determining that the in-focus position is not reliable, control the focusing unit sequentially to a plurality of positions and cause the image sensor to acquire, for each of the plurality of positions, a candidate image of the object,
the optical system includes an objective, and
the surface optically conjugate to the imaging surface is a focal plane of the objective.

18. The observation apparatus of claim 17, wherein the processor is further configured to:
calculate a plurality of focus scores based on the plurality of images, and
determine the reliability of the in-focus position based on the plurality of focus scores.

19. The observation apparatus of claim 18, wherein
wherein the processor determines that the in-focus position is not reliable when the in-focus position does not fall within a specified range,
where the specified range is a position range set in advance for the focusing unit in which the focusing unit in an in-focus state is estimated to be present.

20. The observation apparatus of claim 19, wherein the position range is calculated for the focusing unit by statistically processing history of in-focus positions determined by the processor.

21. The observation apparatus of claim 18, wherein the processor determines that the in-focus position is not reliable when there are a plurality of positions for the focusing unit for which the focus scores indicate peaks.

22. The observation apparatus of claim 21, wherein the processor determines that the in-focus position is not reliable when the in-focus position does not fall within a specified range,
where the specified range is a position range set in advance for the focusing unit in which the focusing unit in an in-focus state is estimated to be present.

23. The observation apparatus of claim 22, wherein the position range is calculated for the focusing unit by statistically processing history of in-focus positions determined by the processor.

24. The observation apparatus of claim 17, wherein the processor determines that the in-focus position is not reliable when the in-focus position does not fall within a specified range,
where the specified range is a position range set in advance for the focusing unit in which the focusing unit in an in-focus state is estimated to be present.

25. The observation apparatus of claim 24, wherein the position range is calculated for the focusing unit by statistically processing history of in-focus positions determined by the processor.

26. The observation apparatus of claim 24, wherein the processor is further configured to:
display a plurality of candidate images acquired at the plurality of positions, and when one candidate image is selected from the displayed plurality of candidate images update the specified range based on a position of the focusing unit that corresponds to the selected one candidate image.

27. The observation apparatus of claim 17, wherein the processor is further configured to:
calculate a plurality of focus scores based on a plurality of candidate images acquired at the plurality of positions, and
based on combinations of the plurality of positions and the plurality of focus scores, update a search range in which the in-focus position is to be searched for and a drive unit distance of the focusing unit within the search range.

28. A method of controlling an observation apparatus that includes an image sensor having an imaging surface and acquires a plurality of images of an object to be observed, an optical system that projects an optical image of the object onto the image sensor, and a focusing unit having an actuator configured to adjust, with reference to an optical-axis direction of the optical system, a relative positional relationship between the stage and the optical system, the method comprising:
determining an in-focus position for the focusing unit based on the plurality of images of the object acquired by the image sensor, the plurality of images each being an image acquired when the focusing unit is located at a different position;
determining a reliability of the determined in-focus position; and
when determining that the in-focus position is not reliable, controlling the focusing unit sequentially to a plurality of positions and causing the image sensor to acquire, for each of the plurality of positions, a candidate image of the object;
wherein the control of the focusing unit adjusts a distance between the stage and the optical system in the optical-axis direction of the optical system.

29. A non-transitory computer-readable medium having stored therein a program for causing a computer for an observation apparatus to perform a process, the observation apparatus including an image sensor having an imaging surface and acquires a plurality of images of an object to be observed, an optical system that projects an optical image of the object onto the image sensor, and a focusing unit having an actuator configured to adjust, with reference to an optical-axis direction of the optical system, a relative positional relationship between the stage and the optical system, the process comprising:
determining an in-focus position for the focusing unit based on the plurality of images of the object acquired by the image sensor, the plurality of images each being an image acquired when the focusing unit is located at a different position;
determining a reliability of the determined in-focus position; and
when determining that the in-focus position is not reliable, controlling the focusing unit sequentially to a plurality of positions and causing the image sensor to acquire, for each of the plurality of positions, a candidate image of the object;
wherein the control of the focusing unit adjusts a distance between the stage and the optical system in the optical-axis direction of the optical system.

* * * * *